US012573717B2

(12) United States Patent
Adams et al.

(10) Patent No.: US 12,573,717 B2
(45) Date of Patent: *Mar. 10, 2026

(54) MICROPOROUS MEMBRANES, SEPARATORS, LITHIUM BATTERIES, AND RELATED METHODS

(71) Applicant: Celgard, LLC, Charlotte, NC (US)

(72) Inventors: Changqing Wang Adams, Fort Mill, SC (US); Michael Bielmann, Zurich (CH); Zhengming Zhang, Rock Hill, SC (US)

(73) Assignee: Celgard, LLC, Charlotte, NC (US)

( * ) Notice: Subject to any disclaimer, the term of this patent is extended or adjusted under 35 U.S.C. 154(b) by 377 days.

This patent is subject to a terminal disclaimer.

(21) Appl. No.: 17/531,929

(22) Filed: Nov. 22, 2021

(65) Prior Publication Data

US 2022/0149481 A1 May 12, 2022

Related U.S. Application Data

(60) Division of application No. 16/574,444, filed on Sep. 18, 2019, now Pat. No. 11,196,126, which is a
(Continued)

(51) Int. Cl.
*H01M 50/417* (2021.01)
*H01M 50/449* (2021.01)
(Continued)

(52) U.S. Cl.
CPC ....... *H01M 50/449* (2021.01); *H01M 50/417* (2021.01); *H01M 50/457* (2021.01); *H01M 50/489* (2021.01); *H01M 10/0525* (2013.01)

(58) Field of Classification Search
CPC ................ H01M 50/417–489; H01M 10/0525
See application file for complete search history.

(56) References Cited

U.S. PATENT DOCUMENTS 6,057,061 A 5/2000 Callahan et al.
6,080,507 A 6/2000 Yu
(Continued)

OTHER PUBLICATIONS

Kesting, Robert E., "Synthetic Polymeric Membranes, a Structural Perspective," 2nd ed., John Wiley and Sons (New York, NY), (p. 237-286), (1985).
(Continued)

*Primary Examiner* — Osei K Amponsah
(74) *Attorney, Agent, or Firm* — J. Clinton Wimbish; Maynard Nexsen PC

(57) ABSTRACT

In accordance with at least selected embodiments, novel or improved separator membranes, separators, batteries including such separators, methods of making such membranes and/or separators, and/or methods of using such membranes and/or separators are disclosed or provided. In accordance with at least certain embodiments, an ionized radiation treated microporous polyolefin, polyethylene (PE), copolymer, and/or polymer blend (e.g., a copolymer or blend comprising PE and another polymer, such as polypropylene (PP)) battery separator for a secondary or rechargeable lithium battery and/or a method of making an ionized radiation treated microporous battery separator is disclosed. The ionized radiation treatment may provide a microporous membrane or battery separator having a lower onset temperature of thermal shutdown, an extended thermal shutdown window, physical, dimensional, and/or mechanical integrity maintained at higher temperatures, improved battery safety performance in a rechargeable lithium battery, a treated polyethylene separator membrane with the high temperature performance of a polypropylene membrane or separator membrane, or polypropylene-based trilayer product (by way of example only, a trilayer membrane made of two polypropylene layers with a polyethylene layer in between), reduced thermal shrinkage resulting in both
(Continued)

improved thermal stability and high temperature physical integrity, which maintains the separation of cathode and anode in a battery system and avoids thermal runaway in a rechargeable or secondary lithium battery, and/or combinations thereof.

31 Claims, 19 Drawing Sheets

Related U.S. Application Data division of application No. 15/093,899, filed on Apr. 8, 2016, now Pat. No. 10,461,293, which is a continuation of application No. PCT/US2016/026576, filed on Apr. 8, 2016.

(60) Provisional application No. 62/145,549, filed on Apr. 10, 2015.

(51) Int. Cl.
H01M 50/457 (2021.01)
H01M 50/489 (2021.01)
*H01M 10/0525* (2010.01)

(56) References Cited

U.S. PATENT DOCUMENTS

| | | | | |
|---|---|---|---|---|
| 6,245,272 | B1 * | 6/2001 | Takita | H01M 50/489 |
| | | | | 264/210.4 |
| 8,795,565 | B2 | 8/2014 | Wei et al. | |
| 2002/0110728 | A1 | 8/2002 | Gozdz et al. | |
| 2006/0286446 | A1 | 12/2006 | Suk-won et al. | |
| 2007/0196638 | A1 | 8/2007 | Wei et al. | |
| 2007/0264578 | A1 * | 11/2007 | Ozaki | H01M 50/44 |
| | | | | 264/41 |
| 2009/0111025 | A1 | 4/2009 | Lee et al. | |
| 2011/0311878 | A1 * | 12/2011 | Inagaki | C08J 5/2231 |
| | | | | 429/246 |
| 2013/0011716 | A1 * | 1/2013 | Sano | H01M 50/581 |
| | | | | 521/27 |
| 2013/0337311 | A1 | 12/2013 | Itou | |
| 2014/0315065 | A1 | 10/2014 | Mizuno et al. | |

OTHER PUBLICATIONS

Kesting, Robert E., "Synthetic Polymeric Membranes, a Structural Perspective," 2nd ed., John Wiley and Sons (New York, NY), (p. 290-297), (1985).
Office Action received for Chinese Patent Application No. 2022-11412909.9, mailed on Jun. 30, 2025, 15 pages including English translation.

* cited by examiner

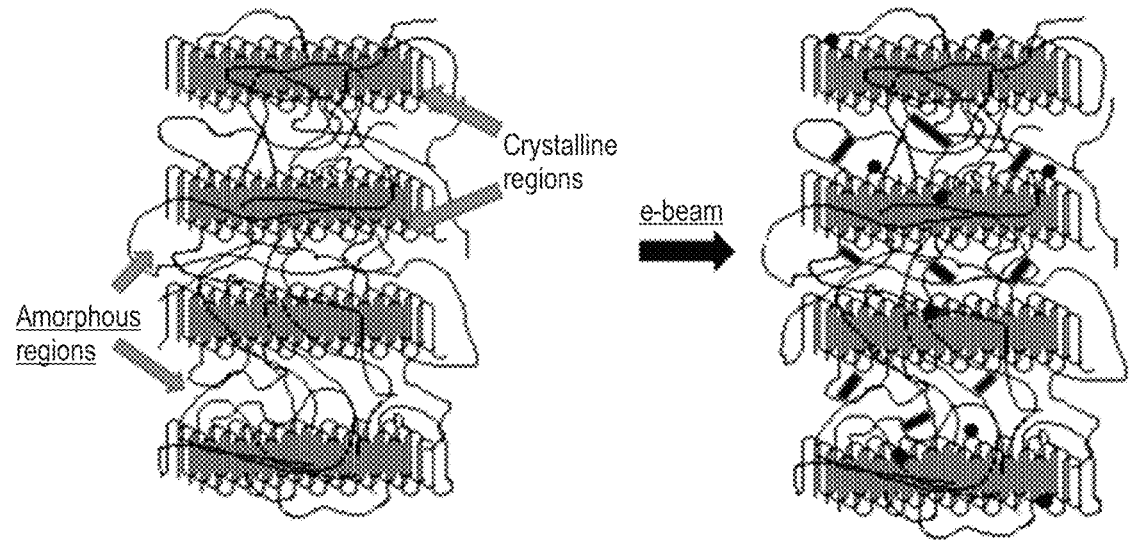
Figure 1
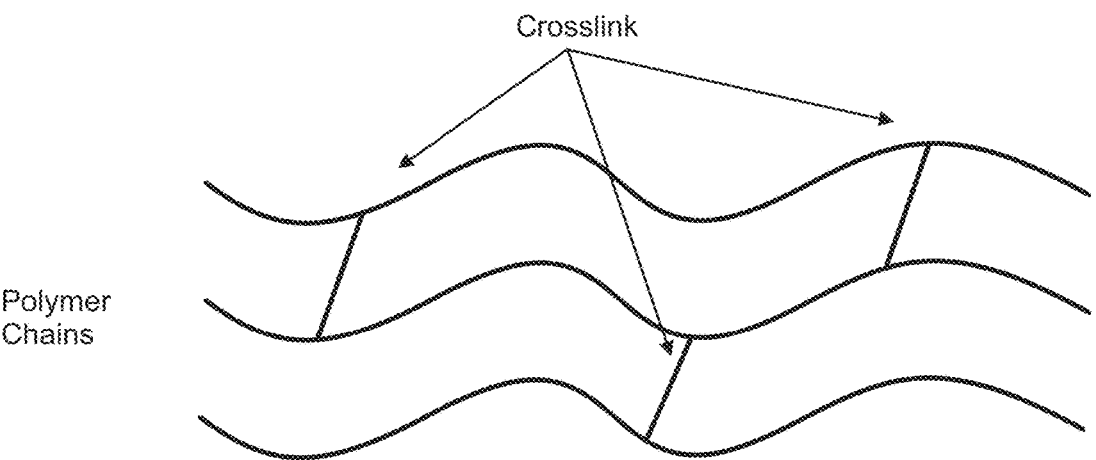
Figure 2. Schematic of Cross-linked Polymer Chains after Electron Beam Irradiation.

Figure 10.   Thermal Shutdown Curve for Untreated and E-beam Treated Microporous Separator Membranes.

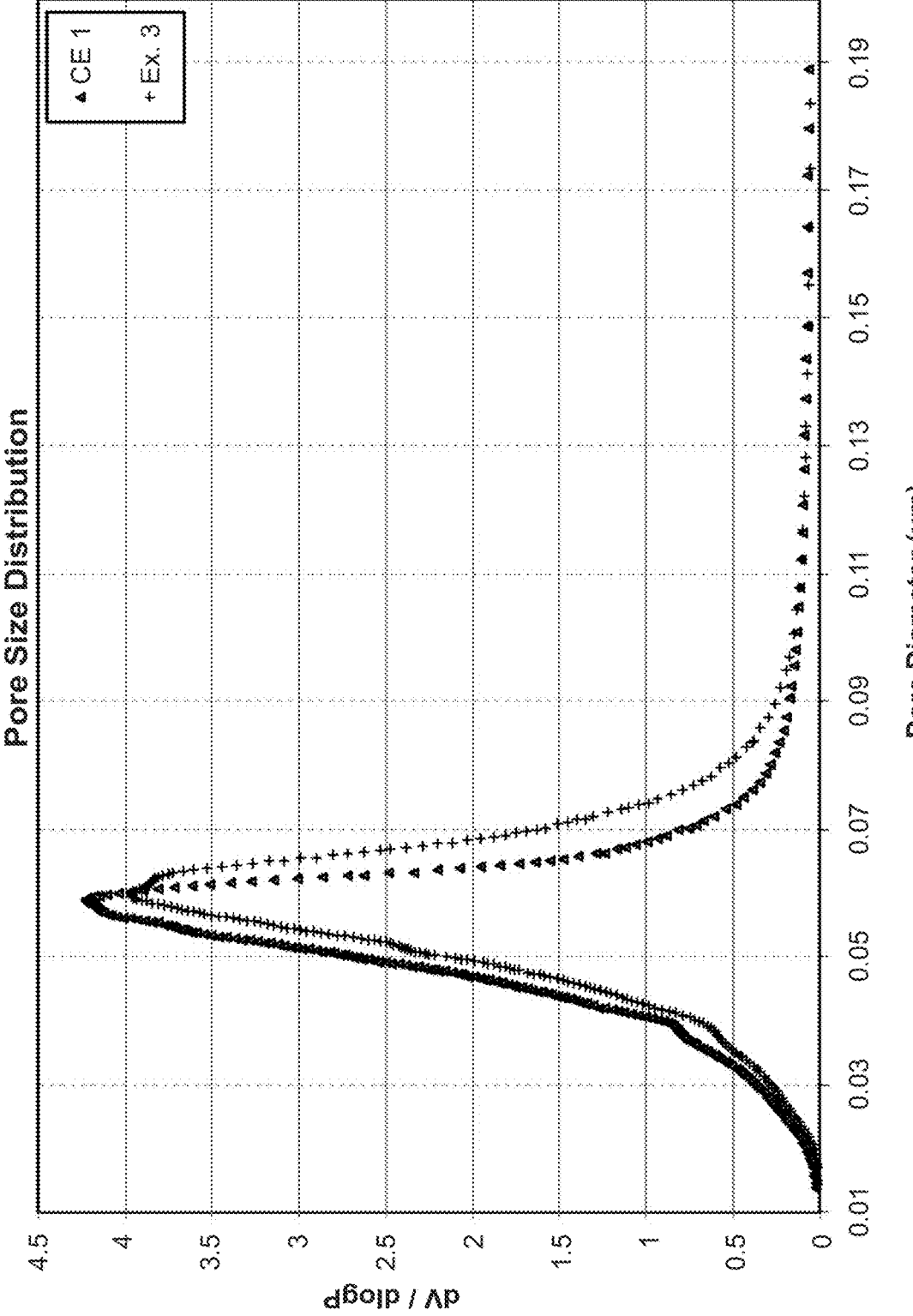
Figure 12. Pore Size Distribution of Electron Beam Treated Ex. 3 Compared to CE 1.

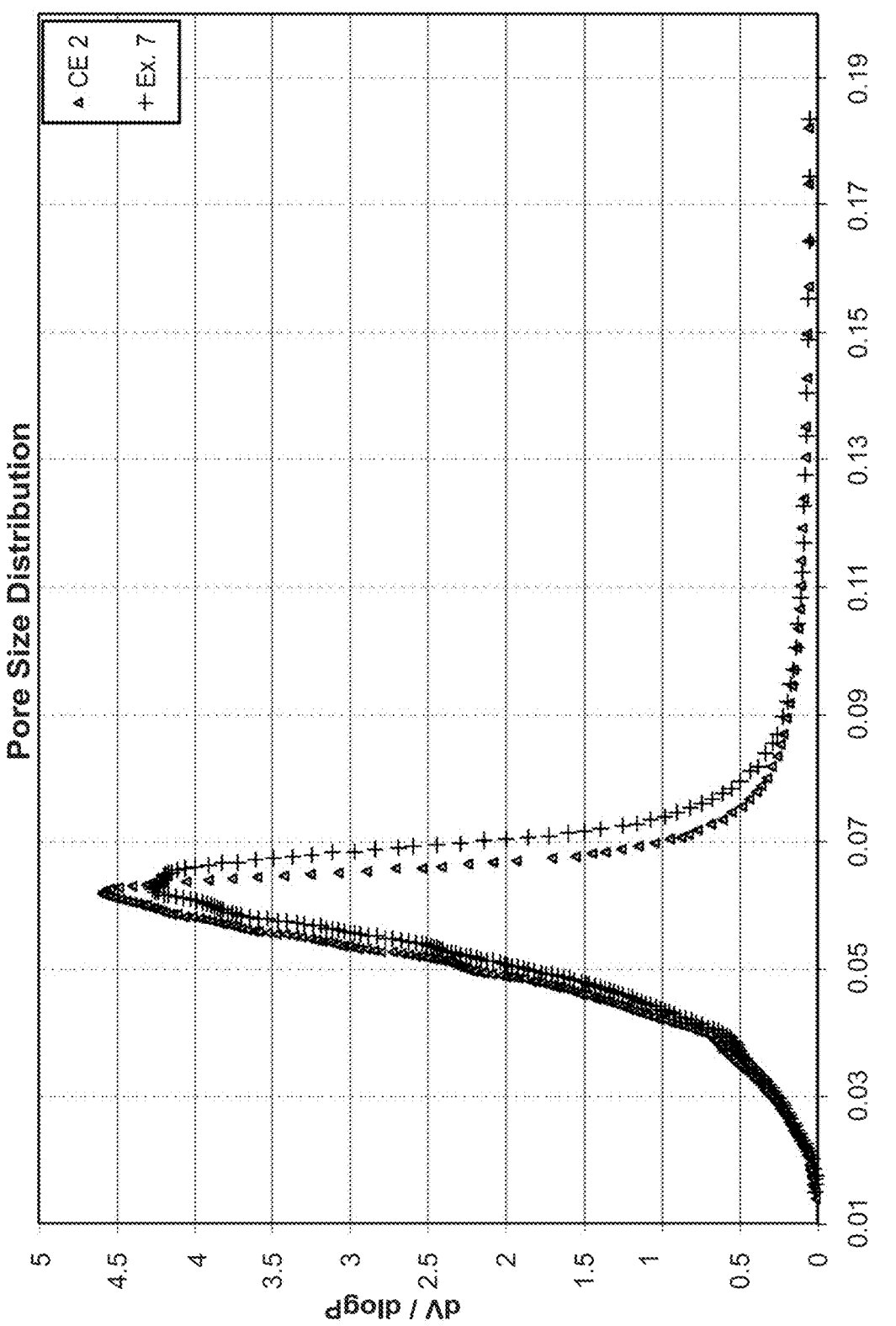
Figure 13. Pore Size Distribution of Electron Beam Treated Ex. 7 Compared to CE 2.

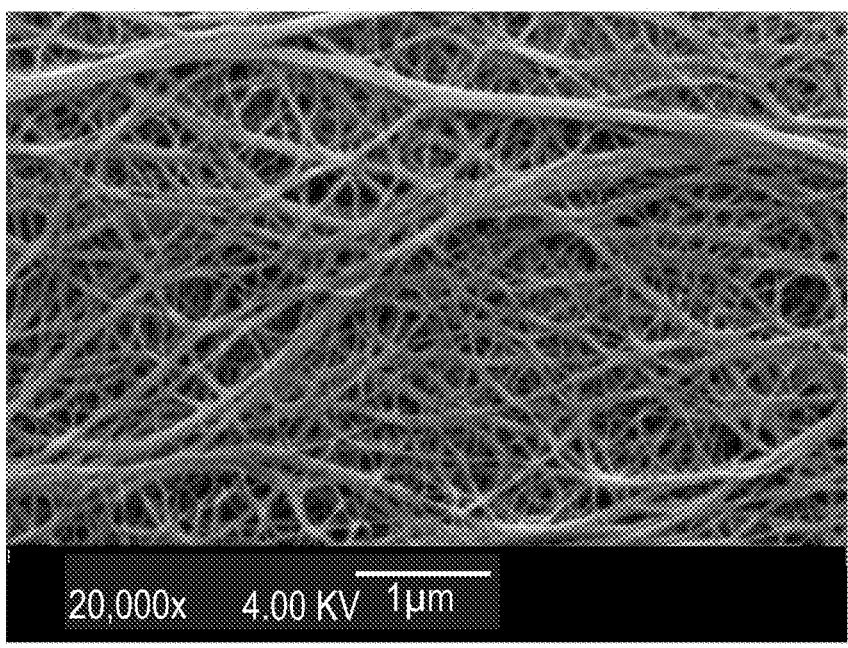
Figure 14. SEM Micrograph of Surface of CE 2 before Electron Beam Treatment.
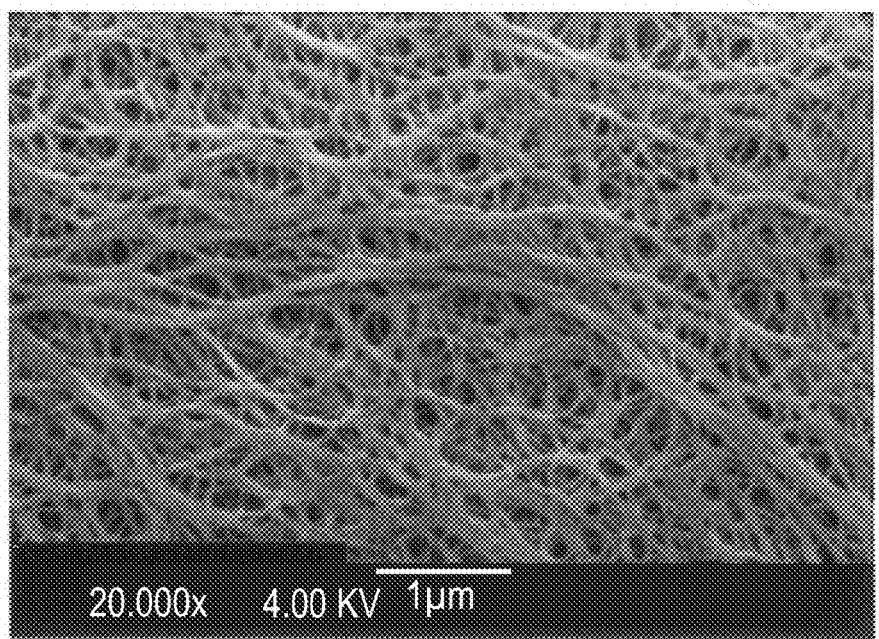
Figure 15. SEM Micrograph of Surface of Ex. 7 after Electron Beam Treatment.

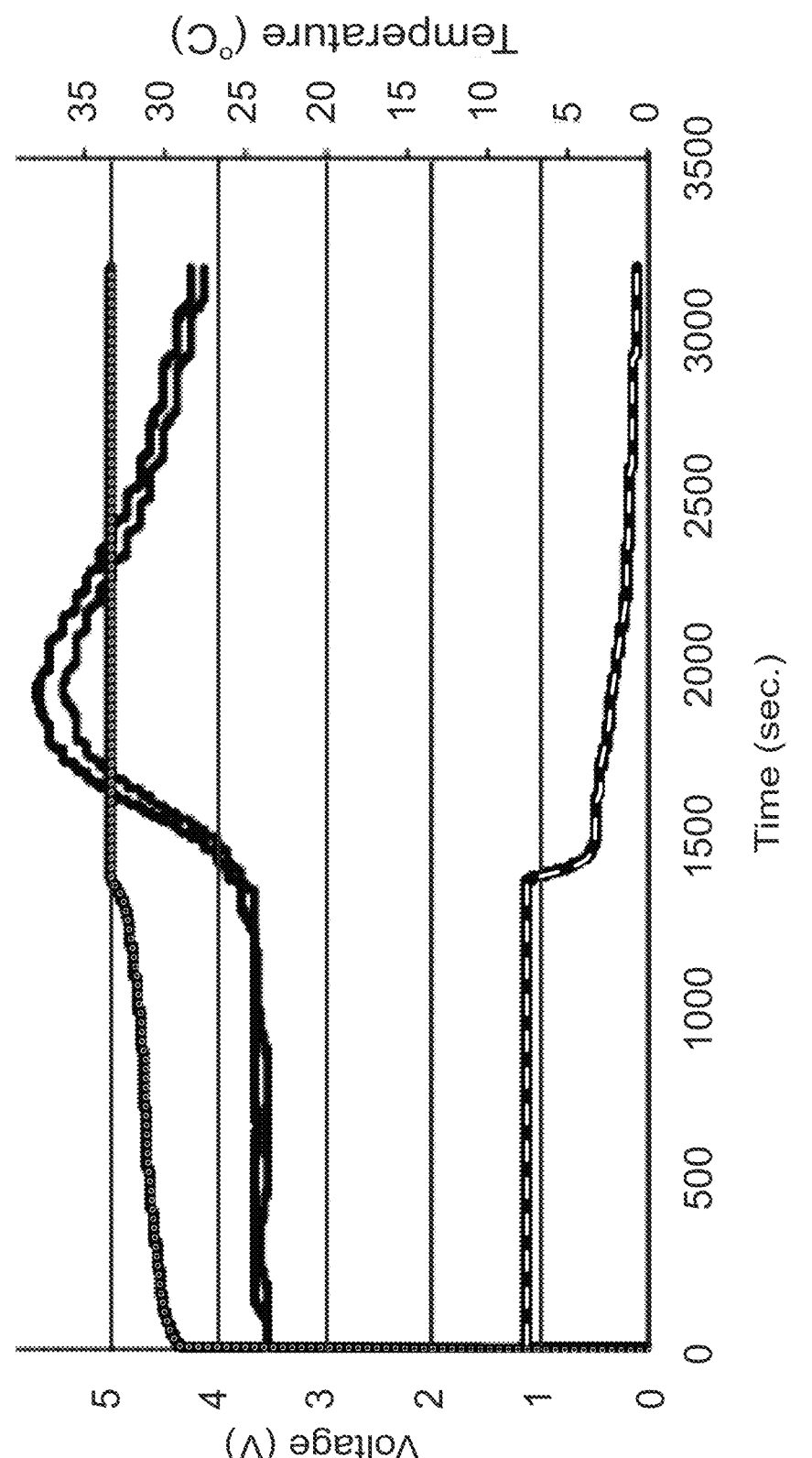
Figure 16. Overcharge Test Plot for Non-Radiation Treated CE 1.

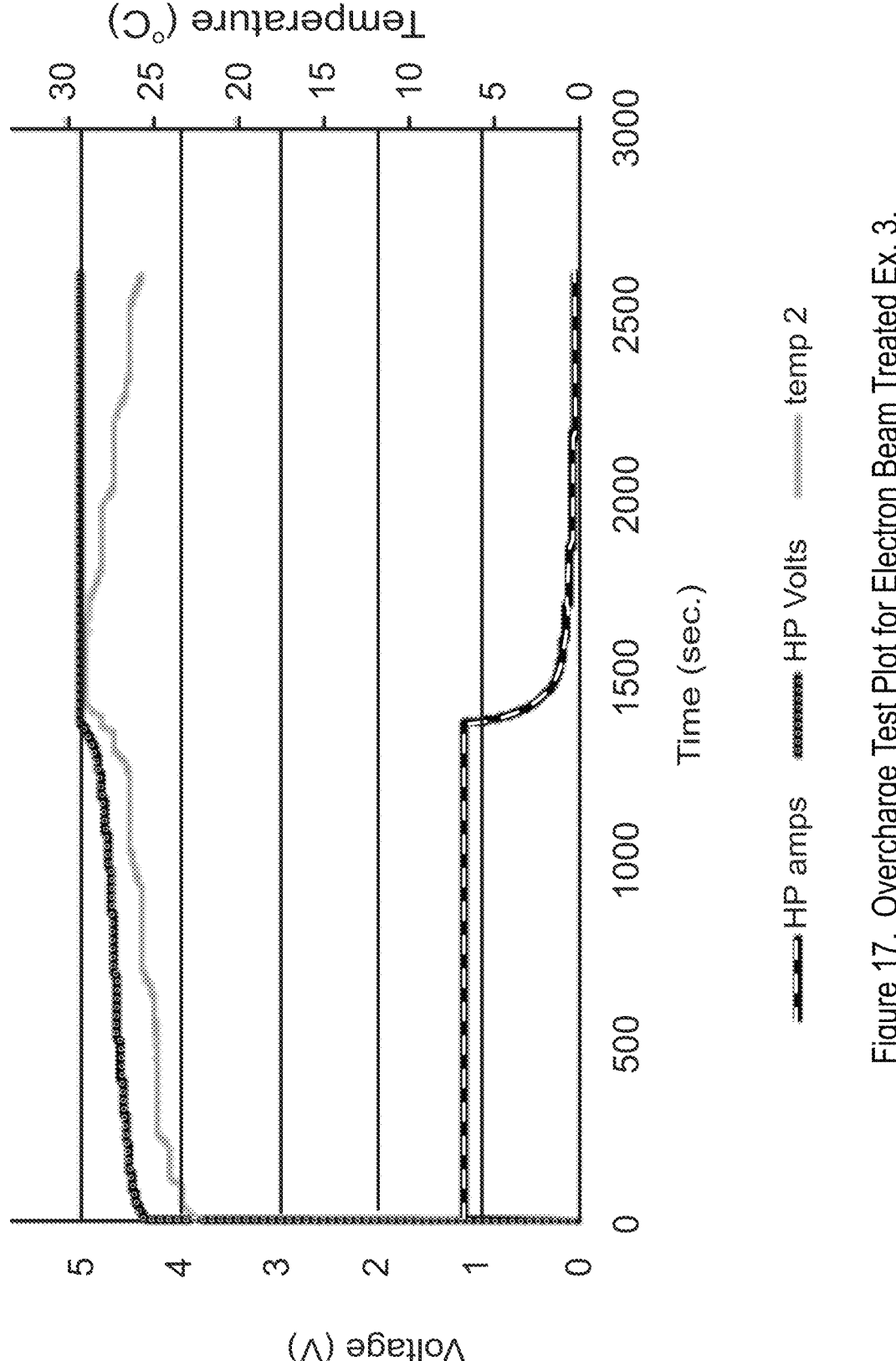
Figure 17. Overcharge Test Plot for Electron Beam Treated Ex. 3.

Figure 20. Results of Ball Crush Tested CE 1

Figure 21. Results of Ball Crush Tested Ex. 3.

MICROPOROUS MEMBRANES, SEPARATORS, LITHIUM BATTERIES, AND RELATED METHODS

CROSS-REFERENCE TO RELATED APPLICATIONS

This application is a divisional application to U.S. application Ser. No. 16/574,444, filed Sep. 18, 2019, which claims priority to U.S. application Ser. No. 15,093,899, filed Apr. 8, 2016, issued as U.S. Pat. No. 10,461,293 on Oct. 29, 2019, which claims priority to 62/145,549, filed Apr. 10, 2015, which is a continuation of PCT Application No. PCT/US2016/026576 filed Apr. 8, 2016, and all of which are incorporated herein by reference in their entirety.

FIELD OF THE INVENTION

In accordance with at least selected embodiments, the present application or invention is directed to novel or improved separator membranes, separators, batteries including such separators, methods of making such membranes and/or separators, and/or methods of using such membranes and/or separators. In accordance with at least certain embodiments, the present invention is directed to an ionized radiation treated microporous polyolefin, polyethylene (PE), polypropylene (PP), copolymer, and/or polymer blend (e.g., a copolymer or blend comprising PE and another polymer, such as polypropylene (PP)) membranes, microporous membranes, separator membranes, battery separators, and/or microporous battery separators for a secondary or rechargeable lithium battery and/or methods of making and/or using ionized radiation treated membranes, microporous membranes, separator membranes, battery separators, and/or microporous battery separators. The inventive microporous membrane or battery separator may provide a lower onset temperature of thermal shutdown, may have an extended thermal shutdown window where physical, dimensional, and mechanical integrity is maintained at higher temperatures, may have better oxidation resistance, may improve battery safety performance in a rechargeable lithium battery, may provide a treated polyethylene, polypropylene, or polyolefin separator membrane, may provide a treated dry process product with performance near, at or above a wet process product, may provide a treated polyethylene, polypropylene, or polyolefin separator membrane with higher temperature performance, may provide a treated polyethylene separator membrane with the high temperature performance of a polypropylene-based product, may provide a treated polyethylene separator membrane with the high temperature performance of a polypropylene-based multi-layer or tri-layer product (by way of example only, a trilayer membrane made of two polypropylene layers with a polyethylene or polypropylene layer in between or a trilayer membrane made of two polyethylene layers with a polypropylene or polyethylene layer in between), may have reduced thermal shrinkage resulting in both improved thermal stability and high temperature physical integrity which may be important for maintaining the separation of cathode and anode in a battery system, improving high temperature, high energy, high charge rate, and/or high voltage function, improving safety, and/or avoiding a short or thermal runaway event in a rechargeable or secondary lithium battery, and/or combinations thereof.

BACKGROUND OF THE INVENTION

Ionizing radiation may include high speed, energetic, subatomic particles, ions or small atoms, or the like. Without wishing to be bound by theory, ionizing radiation may remove electrons from atoms or molecules when it passes through or collides with a material. The ionized atoms or molecules can undergo radiolysis and form free radicals to trigger further chemical reactions. One form of ionizing radiation is an electron beam or e-beam radiation. E-beam radiation can be high (5 to 10 MeV), medium (500 keV to 5 MeV) or low (80 to 500 keV) in energy level.

It may be desirable to modify properties of various polymeric materials and improve mechanical, thermal, and/or chemical properties of a polymer and extend the range of applications of a polymer. Furthermore, the level of the e-beam dosage may be important in the modification and improvement of the mechanical, thermal and/or chemical performance properties of polymers such as polyolefins, which are commonly used in microporous polyolefin battery separator membranes for rechargeable batteries, such as various lithium batteries, such as lithium metal and/or lithium ion batteries.

Polyolefins, such as polyethylene (PE) and polypropylene (PP), are semi-crystalline polymeric materials which are commonly used in the manufacture of microporous separator membranes for use as battery separators in rechargeable lithium batteries. Without wishing to be bound by theory, e-beam radiation of polyolefinic materials may break C—C (4.25 eV) and C—H (3.60 eV) bonds forming free radicals which may trigger a competing process of chain scission vs. cross-linking. The predominance of chain scission vs. cross-linking is determined by a polymer's molecular weight, tacticity, and crystallinity and also by e-beam processing conditions such as pressure, temperature, inert atmosphere, and e-beam dosage.

FIG. 1 depicts a semi-crystalline polymer composed of amorphous regions and crystalline regions where polymer chains in the amorphous regions appear as loosely coiled chains tying together lamellae stacks of crystalline regions of the polymer. Chain scission predominates in the crystalline regions due to a lack of mobility of free radicals, while cross-linking prevails in amorphous regions because of polymer chain entanglements. Cross-linked polymer chains are shown in both FIG. 1 and FIG. 2. Due to the increased molecular weight and 3D network generated by cross-linking, a cross-linked polymeric material tends to have higher viscosity and mechanical strength at elevated temperature.

Polymeric materials can be used in microporous battery separator membranes. A battery separator may include a microporous membrane placed between the cathode and anode in a battery system in order to prevent physical contact between the anode and cathode while allowing electrolytic ionic flow during charging and discharging cycles in a battery. There is a growing demand for high energy density, secondary lithium batteries (for example, in some instances, lithium ion batteries).

There is a growing demand for high energy lithium batteries for consumer electronics applications, such as smart phones and laptop computers, for power tools and for electric/hybrid electric vehicle applications. Some such rechargeable or secondary lithium batteries include lithium ion batteries. Lithium ion batteries may include a high performance microporous separator membrane.

SUMMARY OF THE INVENTION

In accordance with at least selected embodiments, the present application or invention may address the above needs or demands, and/or is directed to novel or improved membranes, separator membranes, separators, batteries including such separators, methods of making such membranes and/or separators, and/or methods of using such membranes and/or separators. In accordance with at least certain embodiments, the present invention is directed to an ionized radiation treated microporous polyolefin, polyethylene (PE), copolymer, and/or polymer blend (e.g., a copolymer or blend comprising PE and another polymer, such as polypropylene (PP)) battery separator for a secondary or rechargeable lithium battery and/or a method of making an ionized radiation treated microporous battery separator.

In accordance with at least selected embodiments, aspects, or objects, the present application or invention may provide or is directed to novel or improved separator membranes, separators, batteries including such separators, methods of making such membranes and/or separators, and/or methods of using such membranes and/or separators. In accordance with at least certain embodiments, the present invention is directed to an ionized radiation treated microporous polyolefin, polyethylene (PE), polypropylene (PP), copolymer, and/or polymer blend (e.g., a copolymer or blend comprising PE and another polymer, such as polypropylene (PP)) membranes, microporous membranes, separator membranes, battery separators, and/or microporous battery separators for a secondary or rechargeable lithium battery and/or methods of making and/or using ionized radiation treated membranes, microporous membranes, separator membranes, battery separators, and/or microporous battery separators. The inventive microporous membrane or battery separator may provide a lower onset temperature of thermal shutdown, may have an extended thermal shutdown window where physical, dimensional, and mechanical integrity is maintained at higher temperatures, may have better oxidation resistance, may improve battery safety performance in a rechargeable lithium battery, may provide a treated polyethylene, polypropylene, or polyolefin separator membrane, may provide a treated dry process product with performance near, at or above a wet process product, may provide a treated polyethylene, polypropylene, or polyolefin separator membrane with higher temperature performance, may provide a treated polyethylene separator membrane with the high temperature performance of a polypropylene-based product, may provide a treated polyethylene separator membrane with the high temperature performance of a polypropylene-based multi-layer or trilayer product (by way of example only, a trilayer membrane made of two polypropylene layers with a polyethylene or polypropylene layer in between or a trilayer membrane made of two polyethylene layers with a polypropylene or polyethylene layer in between), may have reduced thermal shrinkage resulting in both improved thermal stability and high temperature physical integrity which may be important for maintaining the separation of cathode and anode in a battery system, improving high temperature, high energy, high charge rate, and/or high voltage function, improving safety, and/or avoiding a short or thermal runaway event in a rechargeable or secondary lithium battery, and/or combinations thereof.

The inventive microporous membrane or battery separator may preferably provide a lower onset temperature of thermal shutdown, may have an extended thermal shutdown window where physical, dimensional, and mechanical integrity is maintained at higher temperatures, may improve battery safety performance in a rechargeable lithium battery, may provide a treated polyethylene separator membrane with the high temperature performance of a polypropylene-based trilayer product (by way of example only, a trilayer membrane made of two polypropylene layers with a polyethylene layer in between), may have reduced thermal shrinkage resulting in both improved thermal stability and high temperature physical integrity which may be important for maintaining the separation of cathode and anode in a battery system and avoiding a thermal runaway event in a rechargeable or secondary lithium battery, and/or combinations thereof.

The ionized radiation treatment of a microporous polyethylene battery separator provides an inventive method to lower the onset temperature of thermal shutdown. Furthermore, the ionized radiation treated microporous polyethylene battery separator membrane has an extended thermal shutdown window where physical, dimensional, and mechanical integrity of the microporous separator membrane is maintained at higher temperatures. The extended high temperature dimensional integrity of the inventive ionized radiation treated separator membrane improves battery safety performance in a rechargeable lithium ion battery. In addition, the extended high temperature dimensional integrity of the inventive ionized radiation treated separator membrane approaches the high temperature performance of a polypropylene-based trilayer product (by way of example only, a trilayer membrane made of two polypropylene layers with a polyethylene layer in between). In addition, the inventive battery separator membrane has reduced thermal shrinkage resulting in both improved thermal stability and high temperature physical integrity which may be important for maintaining the separation of cathode and anode in a battery system and avoiding a thermal runaway event in a rechargeable or secondary lithium battery.

Preferred thermal shutdown characteristics are lower onset temperature, faster shutdown rate and a sustained thermal shutdown window. Various separators that may have thermal shutdown features may include, but certainly are not limited to, single layer polyethylene membranes or a trilayer composed of polypropylene and polyethylene. Shutdown may be provided by polyethylene due to its lower melting point of 130-140° C. As set forth in the disclosure herein, electron beam radiation may provide a means to improve and custom tailor the thermal, mechanical and/or chemical properties of microporous battery separator membranes using a process that is economical, cool, clean and fast.

There is a growing demand for high energy or high voltage lithium batteries for consumer applications, such as smart phones and laptop computers, power tools and for electric/hybrid electric vehicle applications. Some such rechargeable or secondary lithium batteries include lithium ion batteries. Lithium ion batteries may include a high performance microporous separator membrane. As set forth in the disclosure described herein, electron beam radiation may provide a means to improve and custom tailor the mechanical, thermal and chemical properties of microporous battery separator membranes using a process that is economical, has excellent directivity in the direction of electron beam acceleration and can be performed at a high processing rate.

Ionizing radiation treatment using electron-beam (e-beam) radiation is a method to control and custom tailor property modification of mechanical, thermal, and/or chemical properties of microporous battery separator membranes in order to optimize safety and/or performance in various batteries, such as rechargeable or secondary lithium batteries (by way of example only, lithium metal batteries, lithium ion batteries, and so forth). A reduction in the thermal shrinkage of microporous separator membranes results in an increased level of dimensional stability at high temperatures and improved safety performance in a lithium battery. Very low or zero thermal shrinkage of a separator membrane can prevent physical contact between the anode and cathode and reduce chances of electronic shorting in a battery. Repeated charge and discharge cycling can cause a change in the dimensions of some of the internal components in a battery, one component being the separator membrane. The battery assembling process can involve the stacking of cathode/separator/anode in layers or it can involve a length of a stacked cathode/separator/anode rolled in a jellyroll-type configuration. Physical and electronic insulation between the cathode and anode is provided by the separator. Shrinkage of the separator in the machine direction or the transverse direction can, in some instances, lead to contact between the cathode and anode electrode, creating the potential for a short circuit or a thermal runaway event.

Electron beam treatment of a polyethylene (PE) microporous battery separator membrane can achieve a reduction in the thermal dimensional shrinkage of the membrane. Electron beam treatment can be performed on a PE microporous battery separator membrane manufactured using the wet process or the dry process. The wet process involves a thermally induced phase separation process (or TIPS process) including an extrusion step where typically a polymer and a processing aid (and possibly other components) are melted and mixed to form a nonporous extrudate precursor membrane, followed by one or more stretching steps in uniaxial and biaxial directions which can be followed or preceded by one or more extraction steps in any order or combination of multiple steps. Electron beam treatment can be performed on the nonporous extrudate precursor membrane, before or after stretching and before or after extraction, in any order, and on the final finished good product and on any combination of these steps.

Lithium battery manufacturers in order to improve battery safety, may use a microporous battery separator with a thermal shutdown function where the pores of the separator close blocking the flow of ion between the electrodes at the shutdown temperature. Without a flow of ions, the battery ceases to function. Electron beam radiation treatment of a shutdown microporous battery separator membrane can provide a means to adjust the onset temperature of thermal shutdown. Electron beam radiation treatment of a shutdown capable microporous battery separator membrane can provide a means to fine tune the onset temperature of thermal shutdown and allow the adjustment of the onset temperature to a lower temperature. A microporous battery separator membrane with a lower onset thermal shutdown temperature provides blockage of ion flow at a lower temperature.

Thermal shutdown can be measured using Electrical Resistance testing which measures the electrical resistance of the separator membrane as a function of temperature. Electrical resistance (ER) is defined as the resistance value in ohm-cm$^2$ of a separator filled with electrolyte. When thermal shutdown occurs in a battery separator membrane, the ER reaches a high level of resistance on the order of approximately 1,000 to 10,000 ohm-cm$^2$. When a separator membrane maintains this level of electrical resistance at higher temperatures up to ≥180° C., this is called sustained high temperature thermal shutdown. A combination of a lower onset temperature of thermal shutdown and a lengthened shutdown temperature duration increases the sustained "window" of thermal shutdown. A wider thermal shutdown window can improve battery safety by reducing the potential of a thermal runaway event and the possibility of a fire or an explosion.

Thermal shutdown can occur at or near the melting point of a polymer. Thermal shutdown of a polyethylene microporous battery separator membrane depends on the molecular weight of the PE and occurs at the melting point of PE which typically ranges from 130° C. to 145° C. When the battery temperature climbs to 150° C., thermal shutdown could be lost due to a loss of melt integrity of certain PE separator membranes. The thermal shutdown window of a polyethylene microporous battery separator, in some instances, can be 5-15° C. which may be considered to be a narrow window. In a tri-layer microporous battery separator membrane containing polypropylene (PP) and polyethylene (PE), the polypropylene portion may melt at about 165° C. Thermal shutdown of a polypropylene/polyethylene/polypropylene (PP/PE/PP) tri-layer battery separator membrane may have, in some instances, an onset thermal shutdown temperature of 135-145° C. due to the PE layer, but may not fully melt until 165° C. due to the PP layer(s). The sustained thermal shutdown window may occur, in some instances, from 135-145° C. up to 165° C. and may continue until the loss of integrity of the PP layer(s). Therefore, the thermal shutdown window of a PP/PE/PP tri-layer battery separator membrane, in some instances, is wider than the thermal shutdown window of, for example, a single layer polyethylene separator and therefore may have certain desirable characteristics, such as good thermal performance in a lithium rechargeable battery.

In terms of thermal performance, it may be desirable to widen the thermal shutdown window for various PE microporous battery separators. Electron beam treatment of a PE microporous battery separator membrane achieves a lower onset shutdown temperature and a higher melt integrity PE layer, producing the desired widened thermal shutdown window.

Electron beam treatment may have an additional benefit of improving the electrolyte wetting of a microporous battery separator membrane. Low e-beam radiation of a PE microporous battery separator membrane can change the electrolyte wetting in a lithium battery by reducing the contact angle of the electrolyte liquid on both the surface of the separator membrane and in the internal porous structure of a microporous separator membrane. A lower contact angle indicates higher electrolyte absorption which can lead to improved capacity in a lithium battery.

BRIEF DESCRIPTION OF FIGURES

FIG. 1. includes a Schematic of Semi-Crystalline Polymer Showing Crystalline and Amorphous Regions before and after Electron Beam Treatment.

FIG. 2. includes a Schematic of Cross-linked Polymer Chains after Electron Beam Irradiation Treatment.

FIG. 12. includes Pore Size Distribution of Electron Beam Treated Ex. 3 Compared to CE 1.

FIG. 13. includes Pore Size Distribution of Electron Beam Treated Ex. 7 Compared to CE 2.

FIG. 14. includes an SEM Micrograph of Surface of CE 2 before Electron Beam Treatment.

FIG. 15. includes an SEM Micrograph of Surface of Ex. 7 after Electron Beam Treatment.

FIG. 16. includes an Overcharge Test Plot for Non-Radiation Treated CE 1.

FIG. 17. includes an Overcharge Test Plot for Electron Beam Treated Ex. 3.

DETAILED DESCRIPTION OF THE INVENTION

Figure 3:
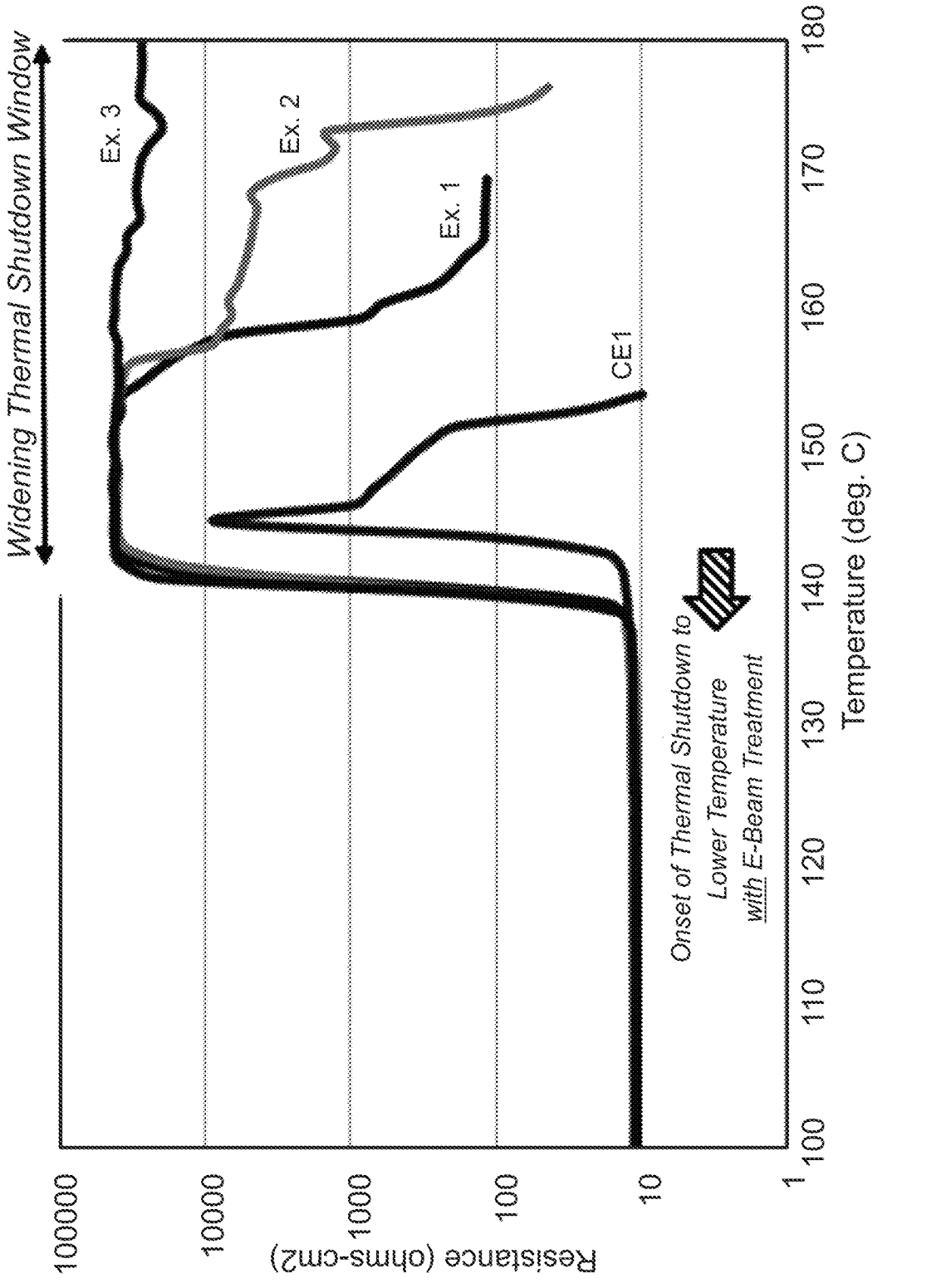
FIG. 3. includes Thermal Shutdown Curves of 9 μm Microporous Polyethylene Separator Membranes as a Function of Electron Beam Treatment Dosage.

In accordance with at least selected embodiments, the present application or invention is directed to novel or improved separator membranes, separators, batteries including such separators, methods of making such membranes and/or separators, and/or methods of using such membranes and/or separators. In accordance with at least certain embodiments, the present invention is directed to an ionized radiation treated microporous polyolefin, polyethylene (PE), copolymer, and/or polymer blend (e.g., a copolymer or blend comprising PE and another polymer, such as polypropylene (PP)) battery separator for a secondary or rechargeable lithium battery and/or a method of making an ionized radiation treated microporous battery separator. In various embodiments where a blend or copolymer comprising PE is used, such a blend or copolymer may include, for example, about 90% or more PE, or about 95% or more PE, and so forth.

The inventive microporous membrane or battery separator may preferably provide a lower onset temperature of thermal shutdown, may have an extended thermal shutdown window where physical, dimensional, and mechanical integrity is maintained at higher temperatures, may improve battery safety performance in a rechargeable lithium battery, may provide a treated polyethylene separator membrane with the high temperature performance of a polypropylene-based trilayer product (by way of example only, a trilayer membrane made of two polypropylene layers with a polyethylene layer in between), may have reduced thermal shrinkage resulting in both improved thermal stability and high temperature physical integrity which may be important for maintaining the separation of cathode and anode in a battery system and avoiding a thermal runaway event in a rechargeable or secondary lithium battery, and/or combinations thereof.

The ionized radiation treatment of a microporous polyethylene battery separator provides a method to lower the onset temperature of thermal shutdown. Furthermore, the ionized radiation treated microporous polyethylene battery separator membrane has an extended thermal shutdown window where physical, dimensional, and mechanical integrity of the microporous separator membrane is maintained at higher temperatures. The extended high temperature dimensional integrity of the inventive ionized radiation treated separator membrane improves battery safety performance in a rechargeable lithium ion battery. In addition, the extended high temperature dimensional integrity of the inventive ionized radiation treated separator membrane approaches the high temperature performance of a polypropylene-based trilayer product (by way of example only, a trilayer membrane made of two polypropylene layers with a polyethylene layer in between). In addition, the inventive battery separator membrane has reduced thermal shrinkage resulting in both improved thermal stability and high temperature physical integrity which may be important for maintaining the separation of cathode and anode in a battery system and avoiding a thermal runaway event in a rechargeable or secondary lithium battery.

Ionizing radiation treatment in the form of electron-beam radiation, can provide a method or means of controlling and modifying the thermal, mechanical, and/or chemical properties or aspects of microporous battery separator membranes in order to optimize their safety and/or performance in various secondary or rechargeable lithium batteries. In various embodiments described herein, e-beam radiation may be performed alone on separator membranes or it may be performed before, after, or at the same time as some other treatment such as heat treatment, IR treatment, other chemical cross-linking treatment, other cross-linking processes, and/or the like.

Rechargeable lithium battery manufacturers often demand thin microporous separator membranes in the range of 6 to 20 μm in thickness (possibly even thinner), more preferably in the range of 8 to 16 μm in thickness, and most preferably in the range of 8 to 14 μm in thickness. Lithium battery manufacturers are highly focused on safety performance for the lithium battery and consider the battery separator membrane to play an important role in the energy density, cycle life and safety of a battery.

Thin separators are favored by battery manufacturers striving to produce a high energy density lithium battery, for example, a lithium ion battery, that is lighter in weight. The thinner the separator membrane, the more electrode/separator sandwich can be packed into a battery cell resulting in a higher energy density battery. However, a thin battery separator membrane with thicknesses less than 14 μm should be dimensionally stable in both the machine direction (MD) and the transverse (TD) direction at high temperatures and also should have low thermal MD and TD shrinkage in order to maintain physical separation between the anode and cathode in a battery during charge and discharge cycles of a battery. Repeated charge and discharge cycling can cause a change in the dimensions of a battery separator membrane throughout the battery's lifetime. The battery assembling process involves stacking of cathode/separator/anode in layers or a length of a stacked cathode/separator/anode sandwich-like structure rolled in a jellyroll-type configuration. The separator provides physical and electronic insulation between the cathode and anode. Shrinkage of the separator in the machine direction or the transverse direction may lead to contact between the cathode and anode electrode, creating the potential for a short circuit or a thermal runaway event and the potential for a battery fire or explosion.

Monolayer and multilayer polyethylene microporous separator membranes can be treated with electron beam radiation to modify their thermal mechanical performance properties in order to improve safety performance in a lithium battery (including, by way of example only, monolayer and multilayer membranes, copolymer membranes, polymer blend membranes, and/or combinations thereof). The range of dosage of electron beam irradiation depends on several factors such as the molecular weight of the polymer, the crystallinity/amorphous content of the polymer, equipment process conditions, the chemical nature of the gaseous atmosphere exposure before and during treatment, the thickness of the membrane being treated and the targeted separator membrane chemical, mechanical and thermal performance properties. In various embodiments described herein, the polymer used may be a polyethylene having a molecular weight of less than about 800,000. In some embodiments, the polyethylene is a high density polyethylene. A semicrystalline polymer is composed of amorphous regions and crystalline regions where polymer chains in the amorphous regions tie together lamellae stacks of crystalline regions of the polymer. The amount of crystalline regions is denoted by the degree of crystallinity or percent crystallinity. The degree of crystallinity of a polyolefin can be affected by exposure to electron beam radiation since an electron beam can break chemical bonds via chain scission and produce shorter polymeric chains. Electron beam processing can also generate free radical chemical species which can generate crosslinking reactions between polymer chains, as shown in FIG. 2, making longer polymer chains or creating a network of chemically bonded polymer chains.

The predominance of chain scission verses cross-linking activity can be balanced by selecting parameters such as the type of polymer, its molecular weight and distribution, crystallinity, amorphous content, and tacticity and by selecting e-beam processing conditions such as pressure, temperature, presence of oxygen in selected gaseous atmosphere and e-beam dosage. Many polymers undergo both crosslinking and scissioning and which of these processes predominates depends on chemical structure and morphology of the polymer and on the selected e-beam processing conditions.

Based on the growing demand for high energy batteries, such as lithium ion batteries, battery manufacturers are using very thin microporous separator membranes in the range of 8 to 20 μm in thickness, more preferably in the range of 8 to 16 μm in thickness, and most preferably in the range of 8 to 14 μm in thickness because, the thinner the separator membrane, the more electrode material can be designed into a battery cell. A thinner separator membrane has less polymer per unit volume and therefore, can, in some instances, be weaker in mechanical strength in the two dimensional X-Y directions of machine direction and transverse direction than thicker separators. A thinner separator membrane has less polymer per unit volume and therefore, can, in some instances be weaker in a "Z" direction, as measured by puncture strength, than thicker separators. E-beam treatment can be used to improve the high temperature mechanical strength of a separator membrane in the X, Y and Z-directions by chemically and permanently modifying the length of polymer chains, the amount of inter-polymer bonding between chains and the entanglement of the polymer chains.

Electron beam radiation of a polymeric material can lead to a production of free radicals. The free radicals can lead to degradation and/or cross-linking phenomena in a polymeric material. The predominance of the production of free radical associated with chain degradation vs. the occurrence of cross linking leading to chain lengthening as a result of e-beam treatment is affected by the amount of crystalline and amorphous areas in a polymer. E-beam treatment can affect the amorphous regions of a polymer via the creation of inter-polymer bonding known as crosslinking. FIG. 1 depicts the results of e-beam radiation on a polymer. E-beam treatment can also affect the crystalline regions of a polymer via chain scissions creating free radicals on the more available portions of polymer chains, for example, at the one or more outer bends of a polymer chains in folded lamellae crystal regions.

Figure 11:
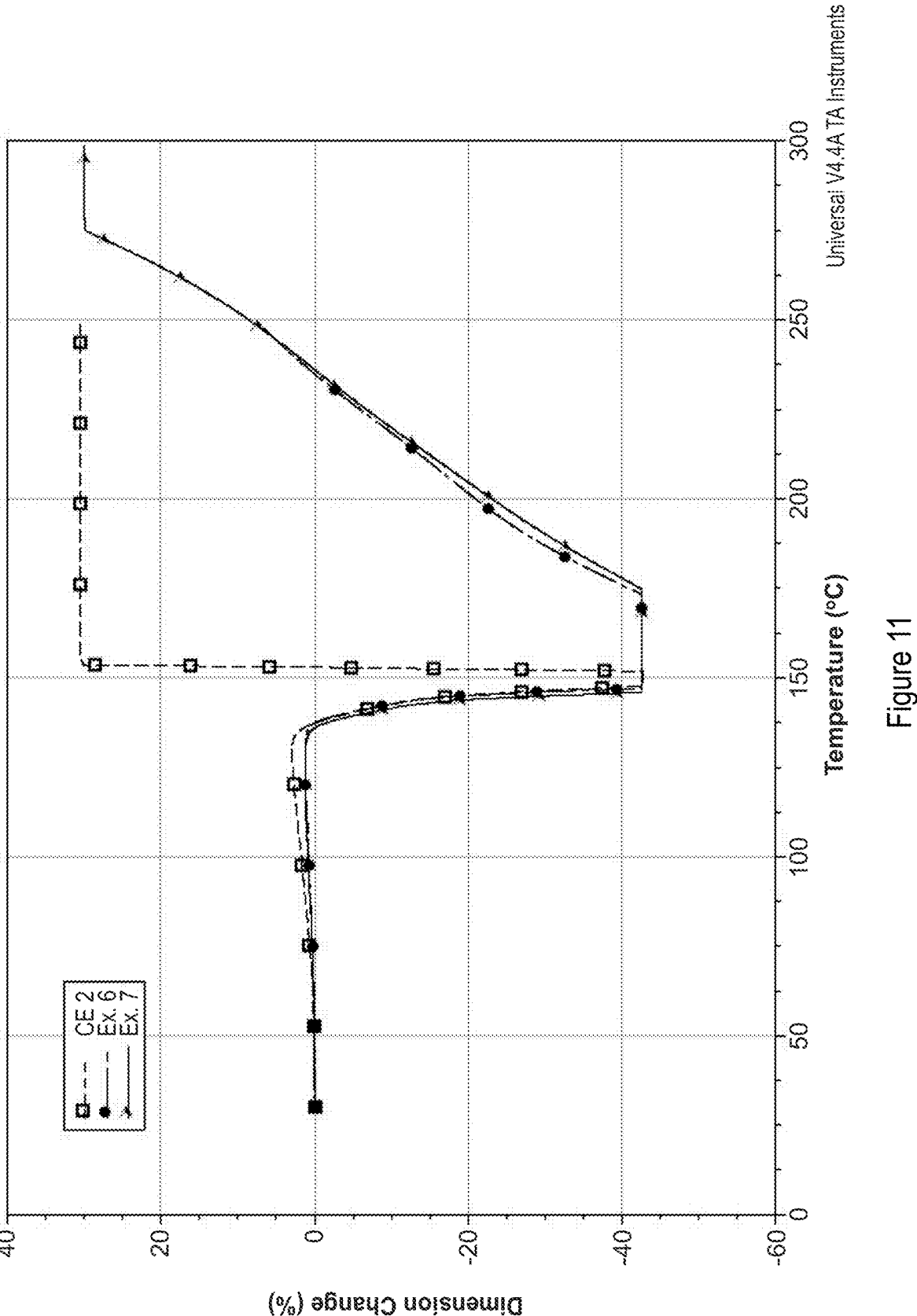
FIG. 11. includes TMA of Untreated and Electron Beam Treated 12 μm Microporous Polyethylene Separator Membranes.

E-beam (or ebeam) treatment of a polyethylene separator membrane can affect some of the mechanical strength properties depending on the selection of the e-beam dosage. Mechanical properties such as MD and TD tensile strength, tensile strain and Young's modulus of the inventive separator membrane is not adversely affected by e-beam treatment of 9 μm and 12 μm microporous separator membranes due to the process conditions determined with much experimental effort. In addition, dielectric breakdown, micro-indentation and mix penetration of e-beam treated PE microporous separator membranes are not adversely affected. Thermal mechanical analysis (TMA), when performed in a tension mode where a test sample is held under constant tension while temperature is ramped up from room temperature to an elevated temperature, shows a shift in the thermal rupture temperature to a higher temperature (see FIG. 11). Thermal rupture temperature is the temperature at which a membrane breaks under applied tension as the temperature is increased. The effect of crosslinking as a result of e-beam treatment of a microporous PE separator membrane can cause this upward shift in rupture temperature demonstrating that the e-beam treated membrane does not break as easily under tension at higher temperatures. The rate of dimensional change is less abrupt after e-beam dosage of 100 kGy. E-beam treatment provides a method to fine tune the thermal rupture temperature of a PE microporous separator membrane by moving it higher or lower depending on the desired thermal performance in a battery, such as a lithium ion battery.

Thermal shutdown occurs at a temperature where the pores of a microporous separator membrane close and the separator membrane is no longer capable of conducting ions. Thermal shutdown of a polyethylene microporous battery separator membrane depends on the molecular weight, density, tacticity and crystallinity of the PE and occurs at or near the melting point of a polymer which typically is in the range of 130 to 145° C. When thermal shutdown occurs in a battery separator membrane, the electrical resistance (ER) reaches a high level of resistance on the order of approximately 1,000 to 10,000 ohm-cm² and the battery is said to have "shutdown". When a separator membrane maintains this level of electrical resistance at temperatures up to ≥180° C., this is called sustained high temperature thermal shutdown.

In the case of a polyethylene microporous separator membrane, after the battery temperature has reached 130 to 145° C. and thermal shutdown has occurred, the temperature of the battery can continue to rise. At a temperature of 150° C., thermal shutdown may, in some instances, be lost due to the loss of "melt integrity" of a polyethylene separator membrane. Melt integrity refers to the physical structure of a membrane defined by its dimensions where the membrane has softened but still holds its shape. A loss of melt integrity means a membrane no longer retains its shape and is a fluid. It is desirable from the standpoint of battery safety, for a microporous separator membrane to maintains its physical shape at high temperatures and have high temperature melt integrity (HTMI). The electron beam treated polyethylene microporous separator membrane Example 3 in FIG. 3 has an extended thermal shutdown window beginning with the onset of thermal shutdown at approximately 137.5° C. and extending to 180° C. The onset of thermal shutdown is accompanied by a sudden increase in Electrical Resistance (ER) from 10 ohm-cm$^2$ to greater than 10,000 ohm-cm$^2$ indicating that the pores of the separator membrane have closed due to the polymer melting, blocking the flow of ions in the battery. When the physical integrity of the membrane is maintained and ER remains high, a battery separator is providing a physical barrier separating anode from cathode and it is preventing the opportunity for a thermal runaway event to occur.

Figure 4:
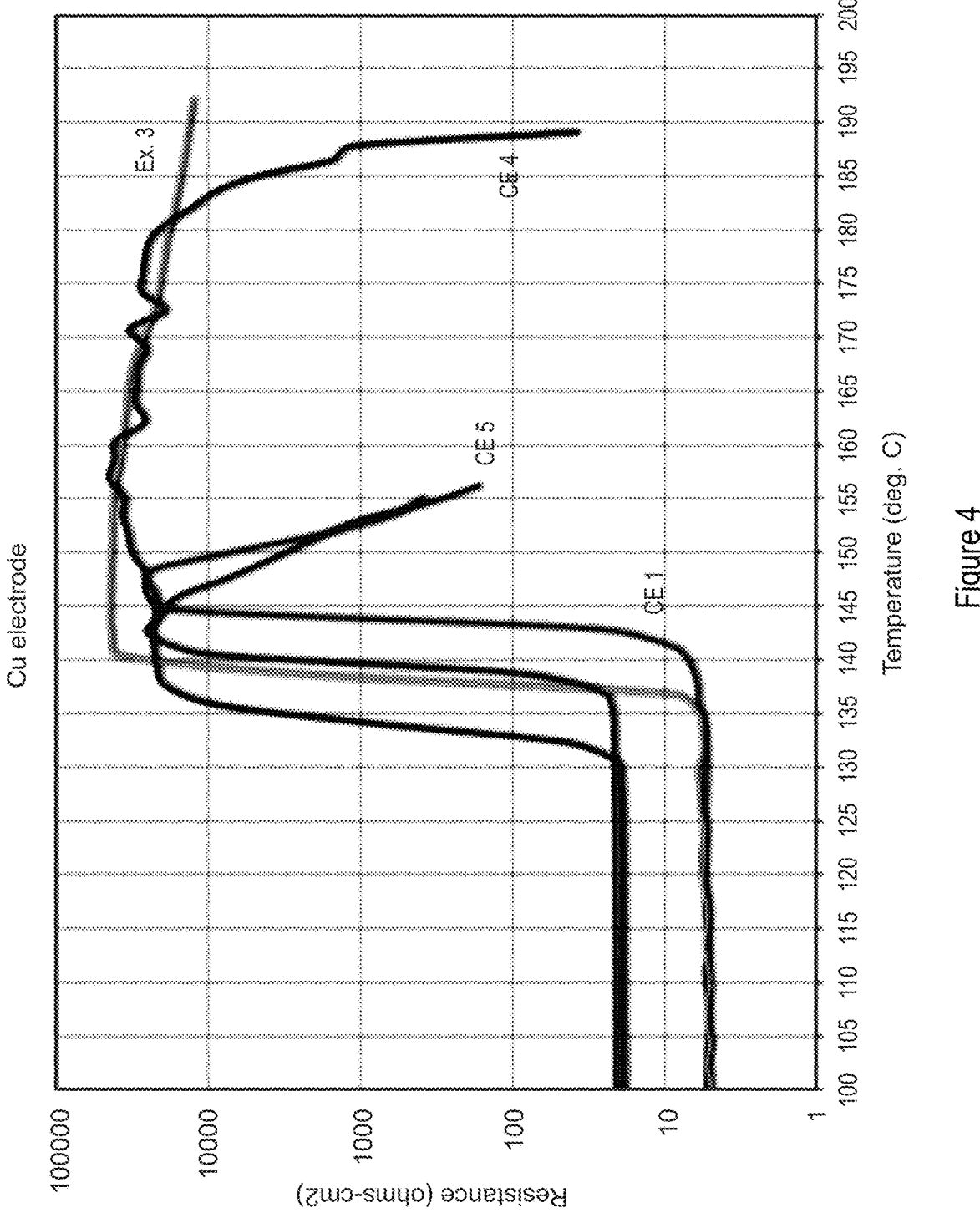
FIG. 4. includes Thermal Shutdown Curves of Microporous Separator Membranes as a Function of Electron Beam Treatment Dosage.

The thermal shutdown window of a typical polyethylene microporous battery separator with a thickness approximately ≤25 μm is on the order of 5-15° C., or sometimes even less (e.g., a total shutdown window of 3° C. from about 144 to 147° C. This may be considered to be a narrow thermal shutdown window. One possible means of increasing the thermal shutdown window is to incorporate a higher melt temperature polymer into the PE. Another method of extending the thermal shutdown window of a porous separator membrane is to layer the PE with one or more higher melt temperature porous layers such as a polypropylene porous membrane layer. The thermal shutdown window can also be adjusted, for example, by using a polypropylene (PP) in a "polypropylene/polyethylene/polypropylene" tri-layer separator membrane configuration where the inner polyethylene layer contributes an early thermal shutdown at 130 to 145° C. and the polypropylene outer layers contribute a higher thermal shutdown around 165° C. Thermal shutdown of a polypropylene/polyethylene/polypropylene (PP/PE/PP) tri-layer battery separator membrane may have an onset temperature as low as 130° C. because the PE inner layer may be manufactured using a dry process which may use a lower molecular weight PE than the PE used to produce some wet process PE membranes or films. Comparative Example CE 4 in FIG. 4 is a PP/PE/PP membrane with an onset shutdown temperature of 130.5° C. and a sustained thermal shutdown window extending to approximately 180° C. The thermal shutdown window of a polypropylene-containing tri-layer battery separator membrane is wider than that of a non-radiated PE separator membrane and provides good thermal safety performance in a lithium ion rechargeable battery at high temperature.

The inventive method modifies a PE microporous battery separator membrane using low energy electron beam radiation to produce a thermally stable PE microporous battery separator membrane that can compete with a trilayer PP/PE/PP microporous battery separator membrane in terms of high temperature performance. A PE microporous battery separator membrane treated with low energy e-beam radiation can achieve a lower onset shutdown temperature and also a higher melt integrity, producing the desired widened thermal shutdown window similar to a PP-containing membrane. In various embodiments described herein, a shutdown window could be increased from some narrow range (e.g., total window of about 3 to about 15° C.) to a window of more than about 30° C. (e.g., a shutdown window widened such that the onset temperature of shutdown is less than about 138° C., such as 137° C., where shutdown is sustained up to greater than 170° C.). Electron beam treatment of PE microporous battery separator membrane can close the gap in high temperature performance between PE and PP in a battery separator membrane for a lithium ion battery and perform as well as a membrane containing PP.

EXAMPLES

Monolayer polyethylene microporous separator membranes were treated with electron beam radiation to modify their thermal and mechanical performance properties and improve safety performance in a lithium ion battery. Ionizing radiation treatment using electron-beam radiation is a promising innovative approach to the controllable property modification of mechanical, thermal and chemical properties of microporous battery separator membranes in order to optimize safety performance in a lithium ion battery. Electron-beam radiation of very thin microporous separator membranes with thicknesses less than 14 μm, produced a separator membrane with reduced thermal shrinkage and a higher level of dimensional stability at higher temperatures resulting in improved safety performance in lithium ion batteries. Very low or zero thermal shrinkage of a separator membrane can prevent physical contact between the anode and cathode and reduce chances of electronic shorting in a battery. In some instances, repeated charge and discharge cycling can cause a slight change in the dimensions of some of the internal components in a battery including the separator membrane. A battery assembling process involves stacking of cathode/separator/anode layers or a length of a stacked cathode/separator/anode rolled in a jellyroll-type configuration. Physical and electronic insulation between the cathode and anode is provided by the separator. Shrinkage of the separator in the machine direction or the transverse direction may lead to contact between the cathode and anode electrode, creating the potential for a short circuit or a thermal runaway event and to reduce the potential for a battery fire or explosion.

Table 1 and Table 2, both below, list performance data for various separator membranes, having thicknesses in the range of about 9 μm and 12 μm, some of which were electron beam treated microporous separator membranes. Electron beam dosages ranged from 70-120 kGy at an accelerating voltage of 180 kV. The line speed is 50 ft/min with film treated in a nitrogen atmosphere with oxygen levels maintained below 10 ppm.

In Table 1, Patent Examples Ex. 1, Ex. 2 and Ex. 3 are examples of the inventive 9 μm (about 9 μm) wet process microporous monolayer polyethylene battery separator membranes which have been treated with electron beam dosages of 70, 80 and 90 kGy, respectively. Comparative Examples CE 1 and CE 5 are 9 μm (about 9 μm) wet process microporous monolayer polyethylene battery separator membranes that are not e-beam treated. Comparative Example CE 4 is an 8.7 μm dry process polypropylene-containing PP/PE/PP trilayer microporous battery separator membrane that is not e-beam treated.

In Table 2, Patent Examples Ex. 4, Ex. 5, Ex. 6, Ex. 7 and Ex. 8 are examples of the inventive 12 μm wet process microporous monolayer polyethylene battery separator membranes which have been treated with electron beam dosages of 70, 80, 90, 100 and 120 kGy, respectively. Comparative Examples CE 2 and CE 6 are 12 μm and 13.5 μm wet process microporous monolayer polyethylene battery separator membranes, respectively, which have not been e-beam treated. Comparative Example CE 3 is a 14 μm dry process polypropylene-containing PP/PE/PP trilayer microporous battery separator membrane that is not e-beam treated.

Figure 5:
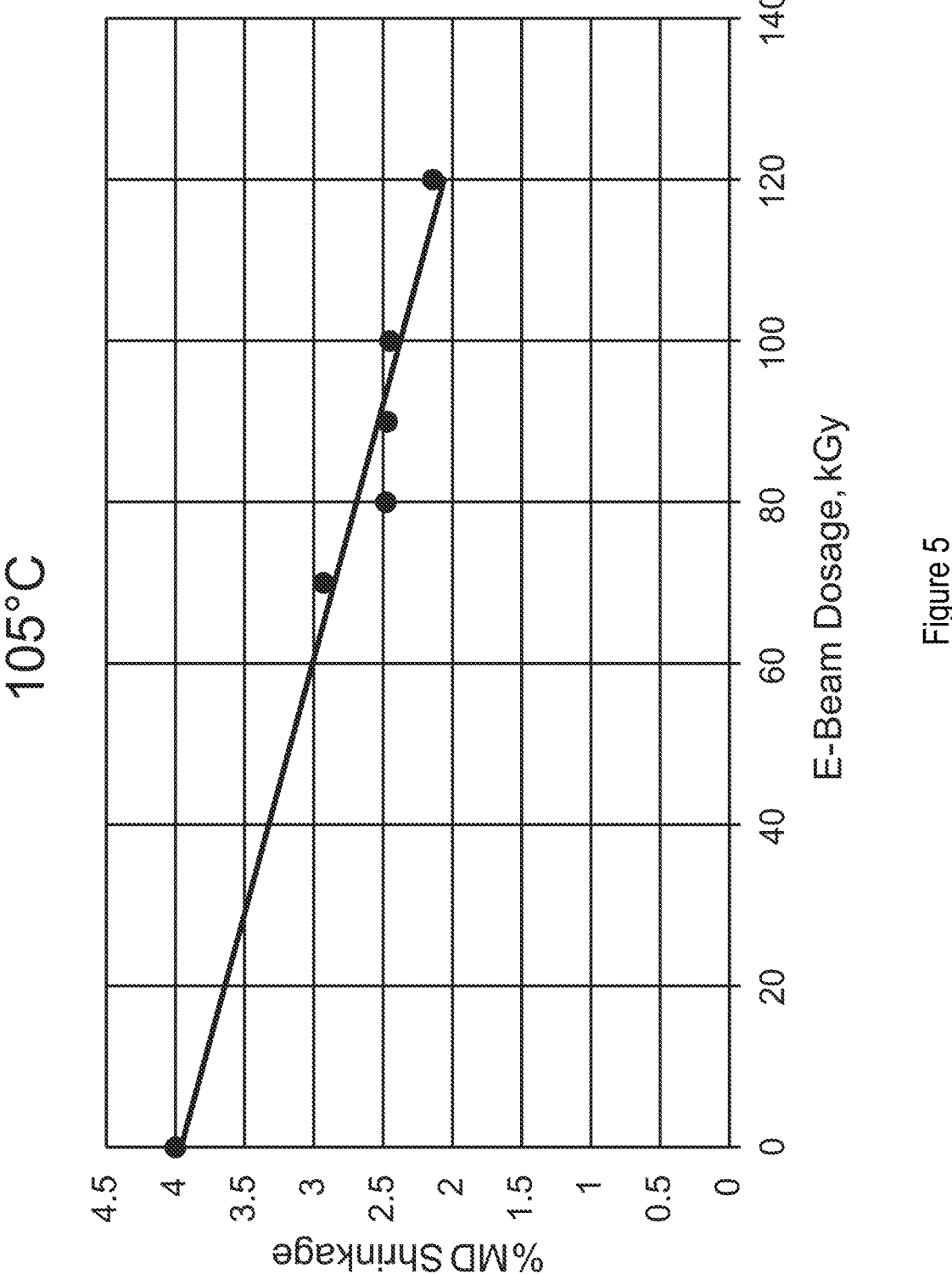
FIG. 5. includes Percent MD Thermal Shrinkage at 105° C. for One Hour of 12 μm Microporous Polyethylene Separator Membranes as a Function of Electron Beam Treatment Dosage.
Figure 6:
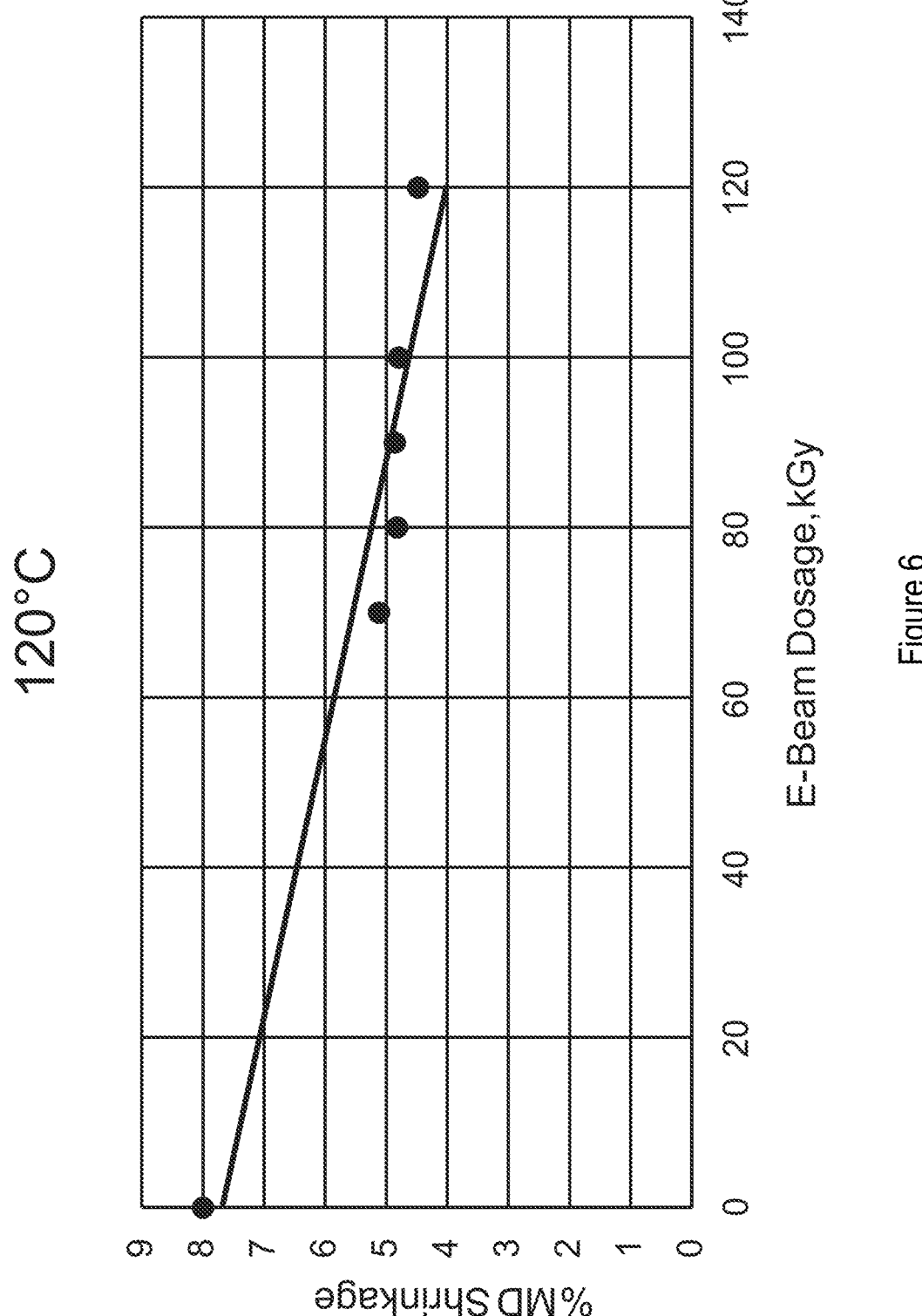
FIG. 6. includes Percent MD Thermal Shrinkage at 120° C. for One Hour of 12 μm Microporous Polyethylene Separator Membranes as a Function of Electron Beam Treatment Dosage.

The inventive method of using e-beam radiation to modify the thermal performance of a PE porous membrane achieved a reduction in machine direction (MD) and transverse direction (TD) shrinkage. FIG. 5 shows percent % MD thermal shrinkage at 105° C. for one hour of 12 μm microporous polyethylene separator membranes as a function of electron beam treatment dosage. The e-beam dosage levels are in the range of 70 to 120 kGy. The level of % MD thermal shrinkage of a microporous polyethylene separator membrane treated at 120 kGy e-beam dosage was reduced from 4% to 2%. FIG. 6 shows percent % MD thermal shrinkage at 120° C. for one hour of 12 μm microporous polyethylene separator membranes as a function of electron beam treatment dosage. The level of % MD thermal shrinkage of a microporous polyethylene separator membrane treated at 120 kGy e-beam dosage was reduced from 8% to 4.5%.

Figure 7:
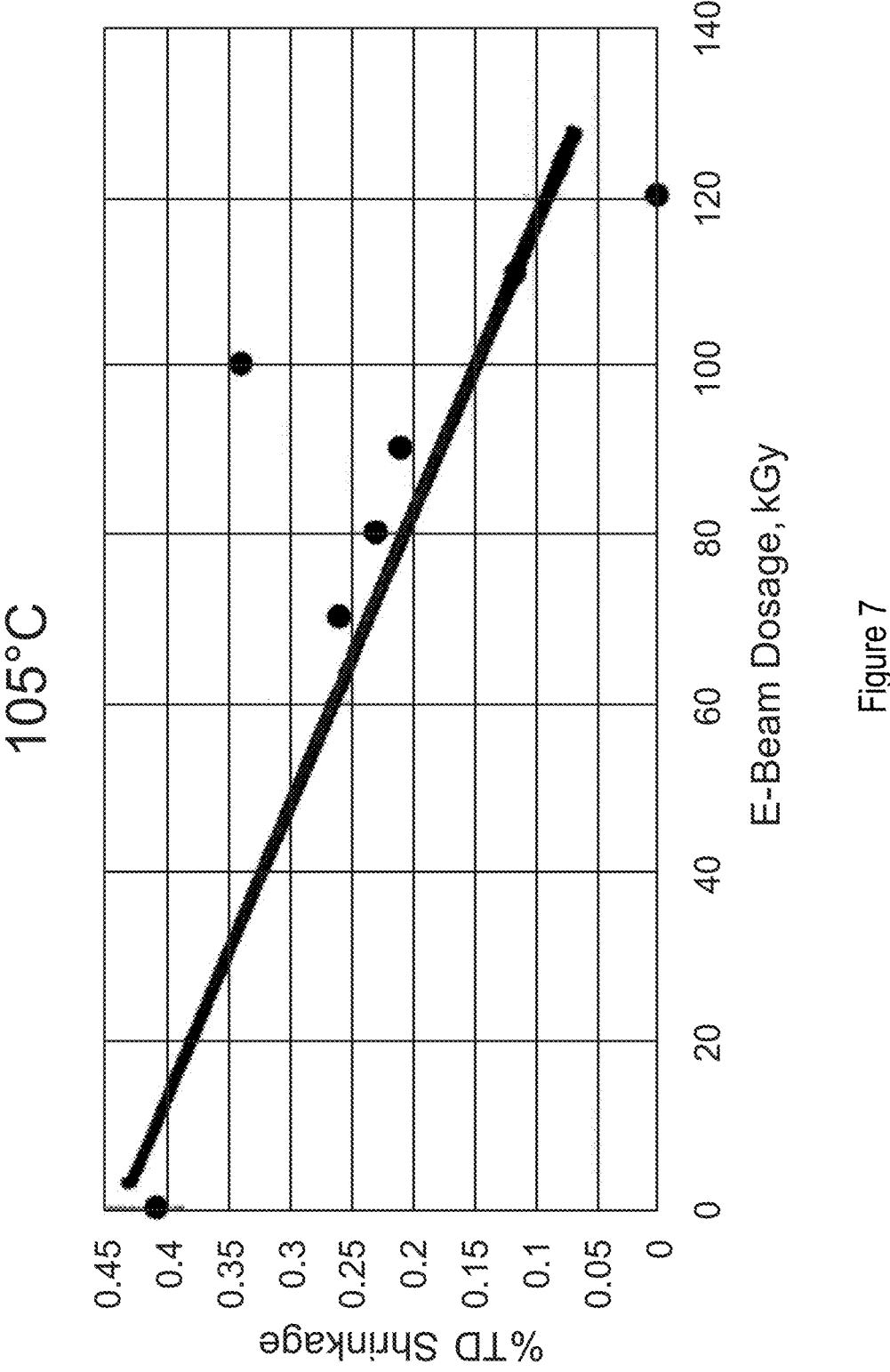
FIG. 7. includes Percent TD Thermal Shrinkage at 105° C. for One Hour of 12 μm Microporous Polyethylene Separator Membranes as a Function of Electron Beam Treatment Dosage.
Figure 8:
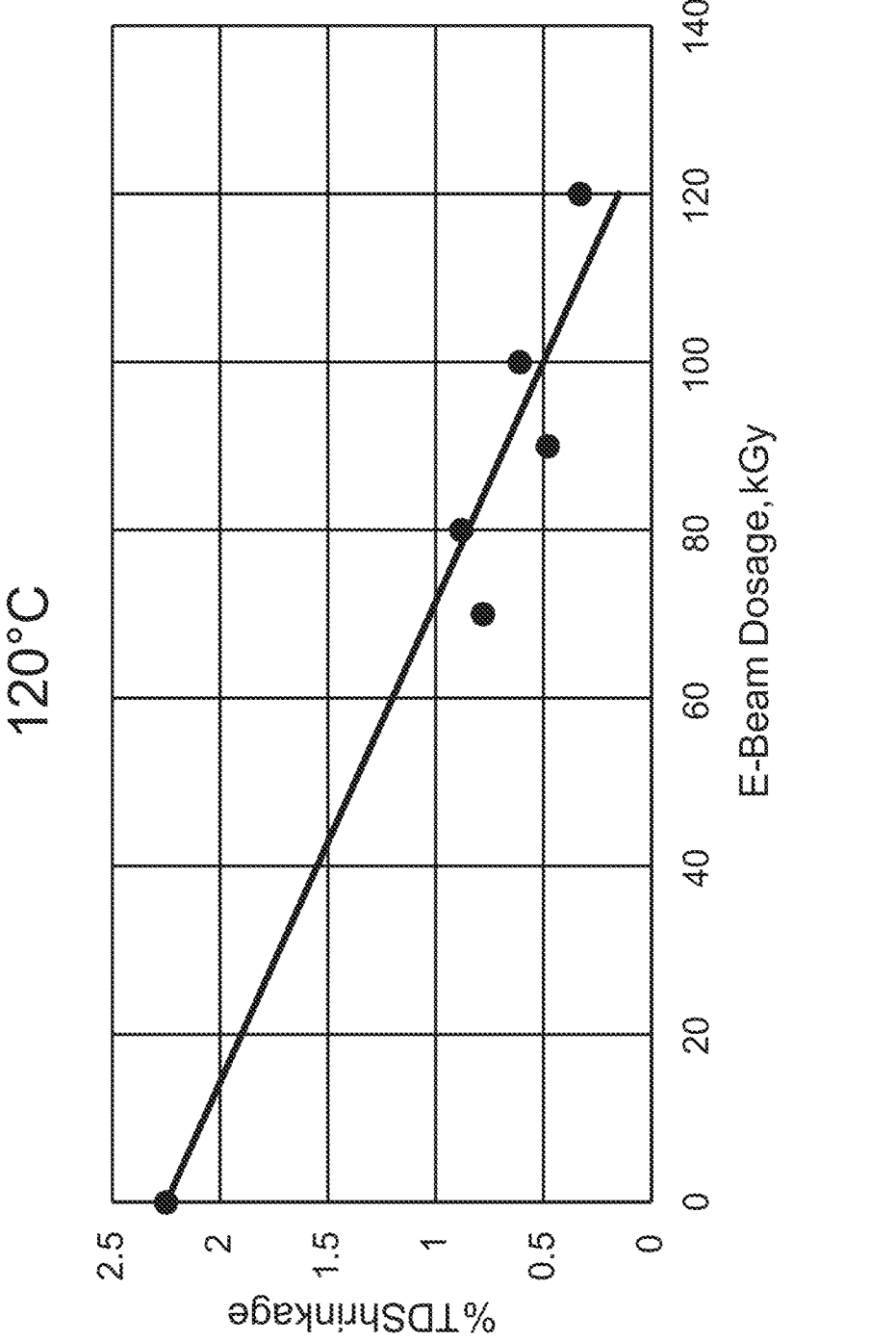
FIG. 8. includes Percent TD Thermal Shrinkage at 120° C. for One Hour of 12 μm Microporous Polyethylene Separator Membranes as a Function of Electron Beam Treatment Dosage.

FIGS. 7 and 8 show the results of Transverse direction (TD) thermal shrinkage testing of e-beam treated PE separator membranes at e-beam dosages ranging from 70 kGy to 120 kGy. The % TD thermal shrinkage was reduced to nearly zero for 120° C.

TABLE 1

Effect of Electron Beam Treatment on Separator Performance
Properties of 9 μm Microporous Separator Membranes.

| Separator Property | units | CE 1 Dosage 0 kGy | Ex. 1 Dosage 70 kGy | Ex. 2 Dosage 80 kGy | Ex. 3 Dosage 90 kGy | CE 5 NA (not available) | CE 4 Dosage 0 kGy |
|---|---|---|---|---|---|---|---|
| Thickness | μm | 9 | 9 | 9 | 8.6 | 9.3 | 8.7 |
| JIS Gurley | second | 106 | 108 | 111 | 107 | 189 | 254 |
| Onset Shutdown Temperature | ° C. | 142 | 137.5 | 137.5 | 137.5 | 137 | 130.5 |
| Puncture Strength | gf | 478 | 382 | 309 | 315 | 339 | 134 |
| MD Shrinkage 105° C.@1 hr | % | 5.50 | 3.67 | 2.93 | 2.89 | 2.48 | 1.8 |
| TD Shrinkage 105° C.@1 hr | % | 0.40 | 0.02 | 0.04 | 0.08 | 1.18 | −0.71 |
| MD Shrinkage 120° C.@1 hr | % | 10.2 | 7.46 | 5.13 | 5.77 | 7.0 | 10.6 |
| TD Shrinkage 120° C.@1 hr | % | 0.80 | 0.37 | 0.04 | 0.50 | 4.0 | 0.26 |
| MD Tensile Strength | kgf/cm² | 2179 | 1486 | 1408 | 1525 | 1779 | 2116 |
| MD Tensile Strain at break | % | 91 | 83 | 71 | 76 | 145 | 76 |
| MD Young Modulus | kgf/cm² | 7940 | 7456 | 7709 | 8473 | 4739 | 6315 |
| TD Tensile Strength | kgf/cm² | 2608 | 1837 | 1778 | 1841 | 1452 | 183 |
| TD Tensile Strain at break | % | 85 | 72 | 76 | 70 | 184 | 59 |
| TD Young Modulus | kgf/cm² | 7845 | 6850 | 6731 | 7808 | 4451 | 2536 |
| Dielectric Breakdown | Volts | 1137 | 1168 | 1256 | 1173 | 1341 | 1010 |
| Micro-indentation | mNf | 162 | 143 | 138 | 134 | 155 | 46 |
| Mix Penetration | % | −52 | −58 | −61 | −59 | −39 | −53 |

TABLE 2

Effect of Electron Beam Treatment on Separator Performance
Properties of 12 μm Microporous Separator Membranes.

| Separator Property | units | CE 2 Dosage 0 kGy | Ex. 4 Dosage 70 kGy | Ex. 5 Dosage 80 kGy | Ex. 6 Dosage 90 kGy | Ex. 7 Dosage 100 kGy | Ex. 8 Dosage 120 kGy | CE 6 NA (not available) | CE 3 Dosage 0 kGy |
|---|---|---|---|---|---|---|---|---|---|
| Thickness | μm | 12.0 | 12.0 | 12.0 | 12.0 | 12.0 | 12.0 | 13.5 | 14 |
| JIS Gurley | second | 124 | 126 | 127 | 128 | 129 | 129 | 190 | 310 |
| Shutdown Temperature | ° C. | 141 | 137 | 137 | 137 | 137 | 137 | 139 | 129 |
| Puncture Strength | gf | 501 | 457 | 450 | 436 | 433 | 415 | 331 | 330 |

TABLE 2-continued

Effect of Electron Beam Treatment on Separator Performance
Properties of 12 μm Microporous Separator Membranes.

| Separator Property | units | CE 2 Dosage 0 kGy | Ex. 4 Dosage 70 kGy | Ex. 5 Dosage 80 kGy | Ex. 6 Dosage 90 kGy | Ex. 7 Dosage 100 kGy | Ex. 8 Dosage 120 kGy | CE 6 NA (not available) | CE 3 Dosage 0 kGy |
|---|---|---|---|---|---|---|---|---|---|
| MD Shrinkage 105° C.@1 hr | % | 4 | 2.93 | 2.48 | 2.47 | 2.45 | 2.14 | 3.03 | 2.09 |
| TD Shrinkage 105° C.@1 hr | % | 0.41 | .26 | .23 | .21 | .34 | 0 | 3.85 | 0 |
| MD Shrinkage 120° C.@1 hr | % | 8 | 5.12 | 4.82 | 4.86 | 4.79 | 4.48 | 26.24 | 5.26 |
| TD Shrinkage 120° C.@1 hr | % | 2.25 | 0.78 | 0.88 | 0.48 | 0.61 | 0.33 | 7.6 | 0.09 |
| MD Tensile Strength at break | kgf/cm$^2$ | 1853 | 1410 | 1386 | 1277 | 1219 | 1462 | 1812 | 2100 |
| MD Tensile Strain at break | % | 126 | 102 | 110 | 104 | 90 | 109 | 11 | 73 |
| MD Young Modulus | kgf/cm$^2$ | 5943 | 5972 | 5878 | 5576 | 5944 | 6167 | 24623 | 6744 |
| TD Tensile Strength at break | kgf/cm$^2$ | 2333 | 1803 | 1760 | 1669 | 1277 | 1959 | 842 | 150 |
| TD Tensile Strain at break | % | 83 | 78 | 72 | 75 | 107 | 80 | 44 | 800 |
| TD Young Modulus | kgf/cm$^2$ | 7629 | 7172 | 7328 | 6780 | 5771 | 7705 | 4112 | 2554 |
| Dielectric Breakdown | Volts | 1545 | 1592 | 1695 | 1640 | 1661 | 1467 | 1572 | 1787 |
| Micro-indentation | mNf | 176 | 162 | 161 | 169 | 147 | 151 | 151 | 128 |
| Mix Penetration | % | −44 | −53 | −51 | −48 | −46 | −47 | −68 | −34 |

In addition to a reduction in thermal shrinkage, e-beam radiation has an effect on the onset temperature of thermal shutdown. FIG. 3 shows thermal shutdown curves of 9 μm microporous PE separator membranes as a function of electron beam dosage. The onset temperature of thermal shutdown is observed to decrease from approximately 143° C. to 139° C.

Electron beams are a form of ionizing radiation where accelerated electrons have enough energy to break chemical bonds in a polymer. Two common types of chemical processes produced by electron beams radiation commonly produces are chain scission and crosslinking. These processes can occur simultaneously when a polymer is irradiated using a low energy electron beam. Chain scission occurs when an electron beam breaks a chemical bond and produces one or more free radicals which can lead to shortened polymeric chains or fragments. At the same time, a low energy electron beam can generate free radicals along the polymer chain or at the end of a polymer chain creating sites for crosslinking reactions. FIG. 2 shows a schematic of various polymer chains which have been cross-linked using e-beam radiation to chemically bond together one or more polymer chains.

The inventive e-beam treated PE microporous separator membrane has a lower onset of thermal shutdown than untreated PE separator membrane. A lower onset temperature of thermal shutdown in a separator has an improved level of safety compared to a separator with a higher thermal shutdown temperature. The onset of a lower temperature of thermal shutdown may be due predominantly to chain scission while the extended, widened thermal shutdown window may be due mainly to crosslinking. The predominance of chain scission vs crosslinking activity can be balanced by selecting parameters such as, the type of polymer, its molecular weight and distribution, crystallinity, amorphous content, and tacticity and by selecting e-beam processing conditions, for example, pressure, temperature, presence of oxygen in a gaseous atmosphere and e-beam dosage. Electron beam dosages ranged from 70-120 kGy at an accelerating voltage of 180 kV. The line speed is 50 ft/min with film treated in a nitrogen atmosphere with oxygen levels maintained below 10 ppm. Many polymers undergo both crosslinking and scissioning and which process predominates depends on chemical structure and morphology of the polymer and on the selected e-beam processing conditions.

Thermal shutdown of a polyethylene microporous battery separator membrane can depend on the molecular weight and crystallinity of the PE and occurs at or near the melting point of a polymer, which typically is in the range of 130 to 145° C. When thermal shutdown occurs in a battery separator membrane, the Electrical Resistance (ER) reaches a high level of ionic resistance, on the order of approximately 1,000 to 10,000 ohm-cm$^2$, and the separator membrane is said to have "shutdown". When a separator membrane maintains the extended high level of Electrical resistance >1,000 to 10,000 ohm-cm$^2$ at temperatures up to ≥180° C. and beyond, this is called "sustained high temperature thermal shutdown".

In the case of a polyethylene microporous battery separator membrane, when the battery temperature climbs to 150° C., thermal shutdown could be lost, in some instances, due to a loss of melt integrity of a polyethylene separator membrane. The thermal shutdown window of a polyethylene microporous battery separator is on the order of 5-15° C., which may be considered a narrow thermal shutdown window. The thermal shutdown window can be adjusted by combining a higher melt temperature polymer such as polypropylene with the polyethylene by blending PE and PP. However, PP has low compatibility with PE and the two polymers PP and PE tend to mix together poorly. Another method of incorporating PP with PE in a separator is by laminating one or more layers of PP with one or more layers of PE to make a stacked, laminated structured membrane. A preferred configuration of a laminated PP and PE containing separator is a "polypropylene/polyethylene/polypropylene" tri-layer separator membrane configuration where the inner polyethylene layer contributes an early thermal shutdown of approximately 130-135° C. and the polypropylene outer layers contribute a higher thermal shutdown at approximately 165° C. Thermal shutdown of a polypropylene/ polyethylene/polypropylene (PP/PE/PP) tri-layer battery separator membrane may, in some instances, have an onset thermal shutdown of 130° C. due to, for example, a dry process inner PE layer, but may not fully melt until 165° C. due to the PP layer(s). FIG. 4 includes the thermal shutdown curve of the PP-containing membrane CE 4, a PP/PE/PP separator membrane. The sustained thermal shutdown window of CE 4 occurs from 130.5° C. and continues until the loss of integrity of the PP layer(s) at ≥180° C. The thermal shutdown window of a PP/PE/PP tri-layer battery separator membrane is wider than a non-radiated treated PE separator membrane CE 1. PP-containing CE4 tri-layer battery separator membrane has good thermal performance in a lithium ion rechargeable battery.

In order for a PE microporous battery separator membrane to compete with a trilayer PP/PE/PP microporous battery separator membrane in terms of thermal performance, the PE thermal shutdown window should be widened. Electron beam treatment of a PE microporous battery separator membrane achieves a lower onset temperature of shutdown and it produces a higher melt integrity PE layer which has the desired widened thermal shutdown window similar to a PP-containing membrane. An electron treated PE microporous battery separator membrane has a wide thermal shutdown window and maintains high temperature melt integrity to temperatures ≥180 degrees C. similar to a PP-containing battery separator membrane in a rechargeable lithium ion battery.

Figure 9:
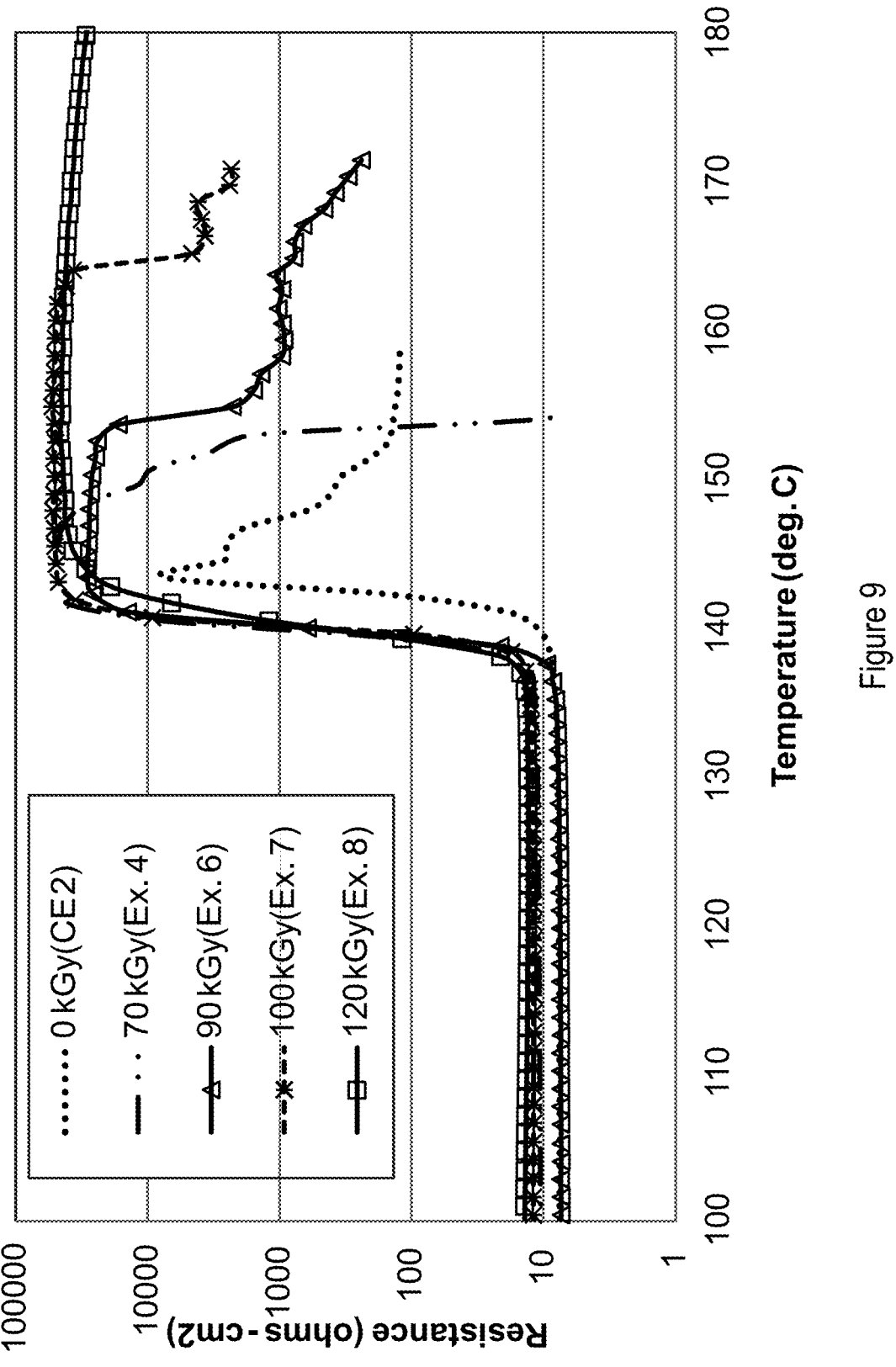
FIG. 9. includes Thermal Shutdown Curves of 12 μm Microporous Polyethylene Separator Membranes as a Function of Electron Beam Treatment Dosage.
Figure 10:
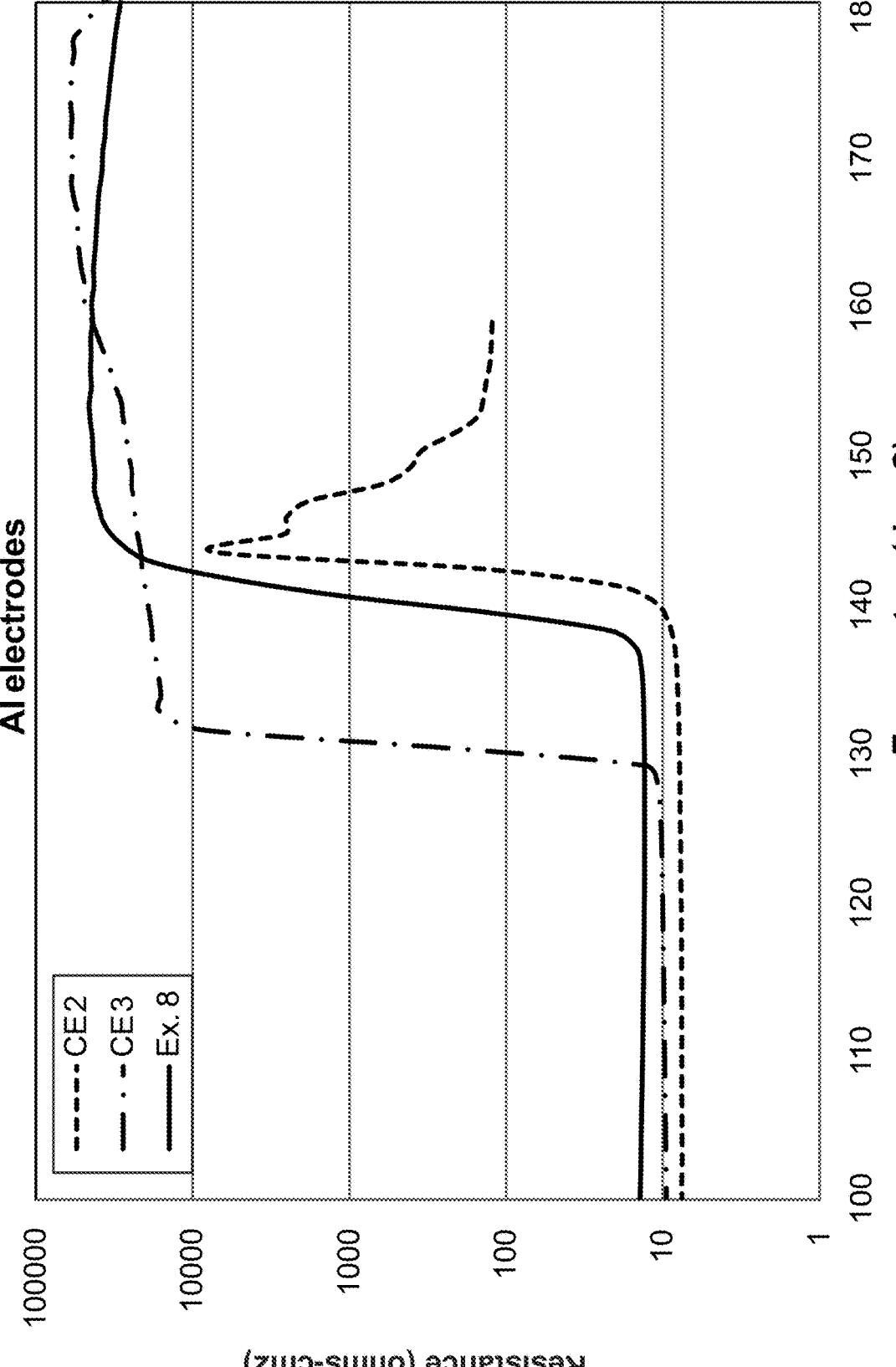
FIG. 10. includes Thermal Shutdown Curves for Untreated and E-beam Treated Microporous Separator Membranes.

FIG. 3 shows the thermal shutdown curves for a 9 μm separator membrane treated with electron beam radiation in the range of 70 to 90 kGy dosage. Ex. 1, Ex. 2 and Ex. 3 were treated with an e-beam dosage of 70, 80 and 90 kGy, respectively. The onset temperature of thermal shutdown decreased from approximately 142° C. to 137.5° C. with increasing e-beam dosage. As the e-beam dosage is increased, the thermal shutdown window is widened. FIG. 4 shows that the thermal shutdown window of Ex. 3 extends to approximately 180° C. which is similar to that of a PP-containing trilayer PP/PE/PP separator membrane CE 4. FIG. 9 shows the thermal shutdown curves for various 12 μm thick PE microporous separator membranes where the e-beam dosage ranges from 70 to 120 kGy. As the e-beam dosage is increased, the thermal shutdown window of the 12 μm separator membrane is extended at high temperatures. Ex. 8 was treated with an e-beam dosage of 120 kGy and has a wide thermal shutdown window extending to ≥180° C. FIG. 10 shows thermal shutdown curves of Ex. 8 and CE 2 where the latter is a PE separator membrane that was not electron beam treated. The beneficial effect of e-beam treatment is shown by comparing Ex. 8 and CE 2 where CE 2 has only very narrow thermal window of approximately 5° C. while Ex. 8 has an extended thermal shutdown window similar to that of CE 3, a PP/PE/PP trilayer laminated separator membrane, indicating that electron beam treatment produced a PE membrane with a thermal shutdown window similar to a membrane containing one or more layers of PP.

The inventive e-beam treatment for a PE microporous separator membrane demonstrates the importance of lowering the onset temperature of thermal shutdown and widening the thermal shutdown window to ≥180° C. E-beam treatment of a microporous separator membrane produces a higher melt integrity separator membrane with an improved level of safety performance in a rechargeable lithium ion battery.

The effect of low energy electron beam treatment on the mechanical strength of a separator membrane was studied using Thermal Mechanical Analysis (TMA), a technique which measures mechanical strength of a membrane as a function of temperature. When TMA is performed in a "tension" mode, a test sample is held under constant tension while temperature is ramped up from room temperature to an elevated temperature. TMA testing of an e-beam treated PE microporous membrane showed a shift in the thermal rupture temperature to a higher temperature (see FIG. 11). Untreated Comparative Example CE 2 melts abruptly around 141° C. and experiences a sudden change in its physical dimension. E-beam treated samples Ex. 6 and Ex. 7, treated at 90 and 100 kGy respectively, responded to applied stress in a different manner. Ex. 6 and Ex. 7 show a more gradual rate of dimensional change with a rise in temperature, indicating the membrane has an increased resistance to dimensional change due to e-beam treatment. It is believed that the increase in strength may be due to the occurrence of crosslinking in the PE polymer membrane and that the upward shift in rupture temperature may indicate the membrane is stronger near its melt temperature. E-beam treatment provides a method to fine tune the thermal rupture temperature of a PE microporous separator membrane by moving it higher or lower depending on the desired thermal performance. The increased high temperature melt strength may help to maintain separation of the cathode and anode in the event of a thermal runaway event.

The effect of electron beam radiation on the pore size distribution of a microporous PE separator membrane is shown FIGS. 12 and 13. There is no statistical difference in the pore size distribution due to e-beam treatment for both the 9 μm and 12 μm PE microporous separator membranes. Table 3 lists percent porosity data and shows e-beam radiation does not impact the porosity of the microporous separator membrane.

TABLE 3

| % Porosity as a Function of E-beam Treatment of PE Microporous Separator Membranes. | | |
|---|---|---|
| Example | E-Beam Dosage | % Porosity |
| CE 1 | 0 | 42.64 |
| Ex. 3 | 90 | 42.27 |
| CE 2 | 0 | 42.32 |
| Ex. 7 | 100 | 42.32 |

The surface morphology of the e-beam treated PE microporous separator membrane is shown in the Scanning Electron Micrograph depicted in FIG. 15. The low energy e-beam treatment did not damage the surface or the pores of the membrane (see also FIG. 14 which depicts an untreated membrane). E-Beam treatment was performed at low e-beam dosage levels and no degradation was observed to the surface or internal pore structure of the PE microporous separator membrane.

Electron beam treatment has an additional benefit of improving the electrolyte wetting of a microporous battery separator membrane. Low e-beam radiation of a PE microporous battery separator membrane can change the electrolyte wetting in a lithium ion battery by reducing the contact angle of the electrolyte liquid on both the surface of the separator membrane and throughout the internal porous structure of a microporous separator membrane. A lower contact angle indicates higher electrolyte absorption which can lead to improved capacity in a lithium ion battery. Table 4 lists contact angle measurement results on 9 μm PE microporous separator membranes. The contact angle, using the electrolyte Propylene Carbonate on the surface of the Ex. 3 exposed to the e-beam radiation at a dosage of 90 kGy, was reduced from 75.8° to 60.2° which is a 20% reduction in contact angle.

TABLE 4

Contact Angle Test Results on 9 μm PE Microporous Battery
Separator Membranes Treated with 90 kGy E-beam Dosage.

| | Contact Angle (°) of Electrolyte on Membrane Surface Exposed to Electron beam | |
|---|---|---|
| Sample ID | CE1 | Ex. 3 |
| Thickness, μm | 9 | 9 |
| Contact Angle Average | 75.8 | 60.2 |
| Standard deviation | 1.9 | 1.1 |
| 95% confidence interval ± | 3.7 | 2.2 |

Overcharge, Cycling, Hot Box and Ball Crush safety tests were performed on battery cells containing the inventive e-beam treated PE microporous membranes. During the Overcharge testing performed on the e-beam radiated membranes, fully charged cells are subjected to a 3 C rate of charge at 5 V. The requirement to pass the Overcharge test is no explosion or fire occurs in the battery. Overcharge test results on CE 1 and Ex. 3 are shown in FIGS. 16 and 17, respectively, and show lower residual current on overcharge after shutdown for Ex. 3 which is an improvement in overcharge performance compared to non-electron beam radiated membrane CE 1.

Figure 18:
FIG. 18. includes a Photograph of Inventive Separator Membrane Ex. 3 after Autopsy of Hot Box Tested Battery Showing Separator was Intact after Being Peeled Away from the Cathode.
Figure 19:
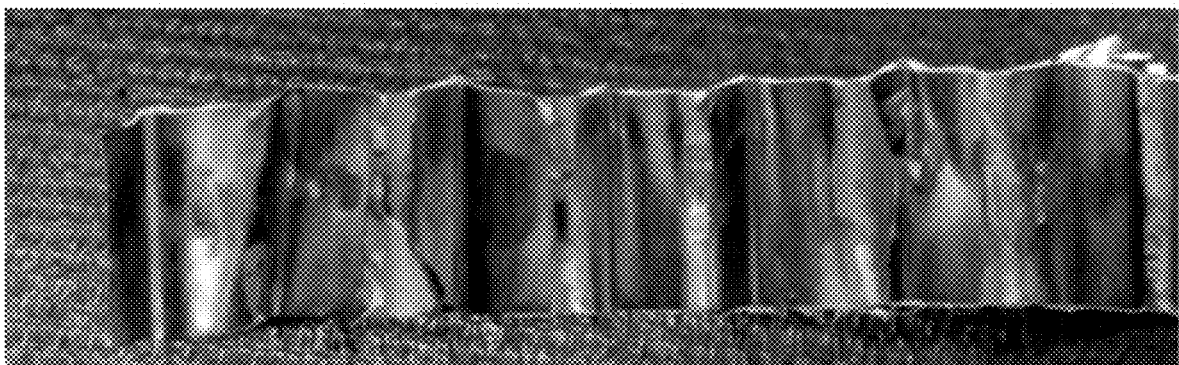
FIG. 19. includes a Photograph of CE 1 after Autopsy of Hot Box Tested Battery Showing Separator is Fully Melted to Cathode and Cannot Be Peeled Away From It.

Ex. 3 was Hot Box tested at 150° C. for one hour. In order to observe the appearance of the e-beam treated membrane after Hot Box testing, battery cells were cooled and opened. FIG. 18 is a photograph of Ex. 3 after removal from a prismatic battery. The e-beam treated Ex. 3 was peeled away from the cathode in an intact piece, indicating that it had not lost its melt integrity and maintained its physical dimensions. In contrast, FIG. 19 shows untreated PE membrane CE 1 had fully adhered to the cathode. CE 1 could not be separated or peeled away from the cathode, indicating that the untreated PE membrane has melted against the cathode a result of the high temperatures experienced during the hot box testing.

Figure 20:
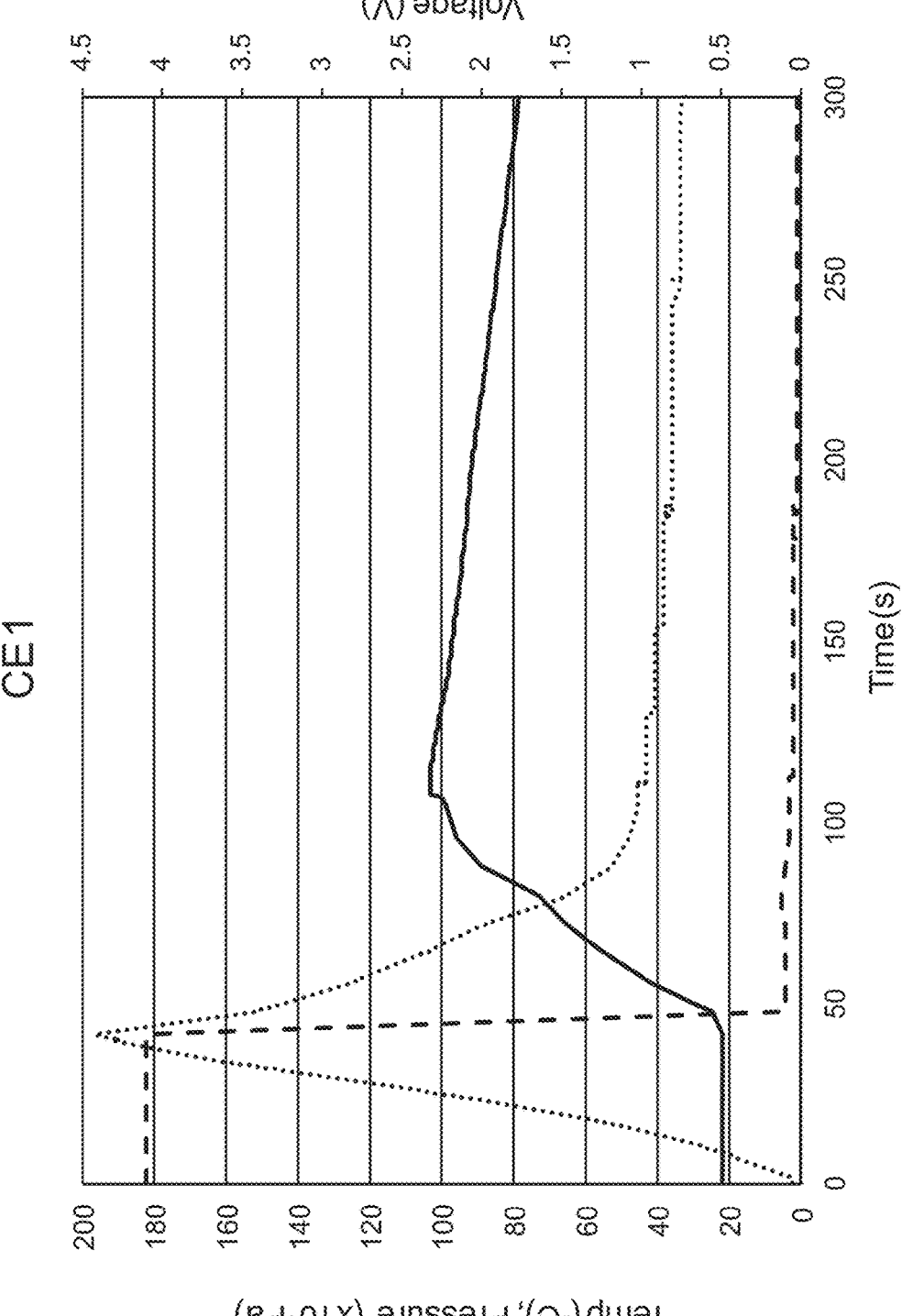
FIG. 20. includes Results of Ball Crush Tested on CE 1.
Figure 21:
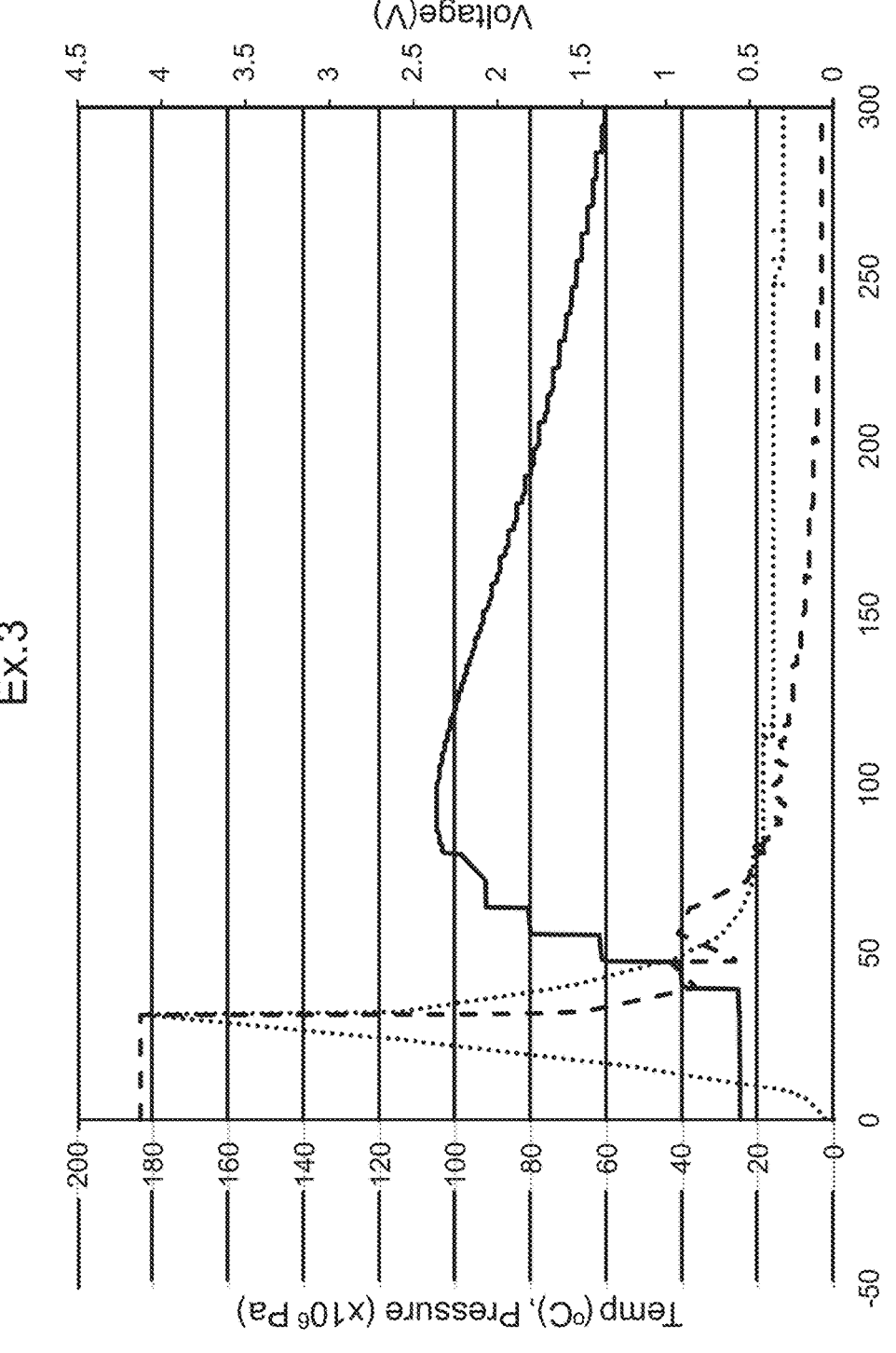
FIG. 21. includes Results of Ball Crush Tested on Ex. 3.

The results of Ball Crush testing, where load is plotted as a function of time, during which temperature and voltage are measured, are shown in FIGS. 20 and 21. Ball Crush testing is a type of internal short circuit testing where a ball shaped probe is pressed against the exterior surface of a battery cell and an increasing load is applied. Both samples passed the Ball Crush test indicating that e-beam treatment did not adversely affect the safety performance of the PE microporous separator membrane in a lithium ion battery.

Figure 22:
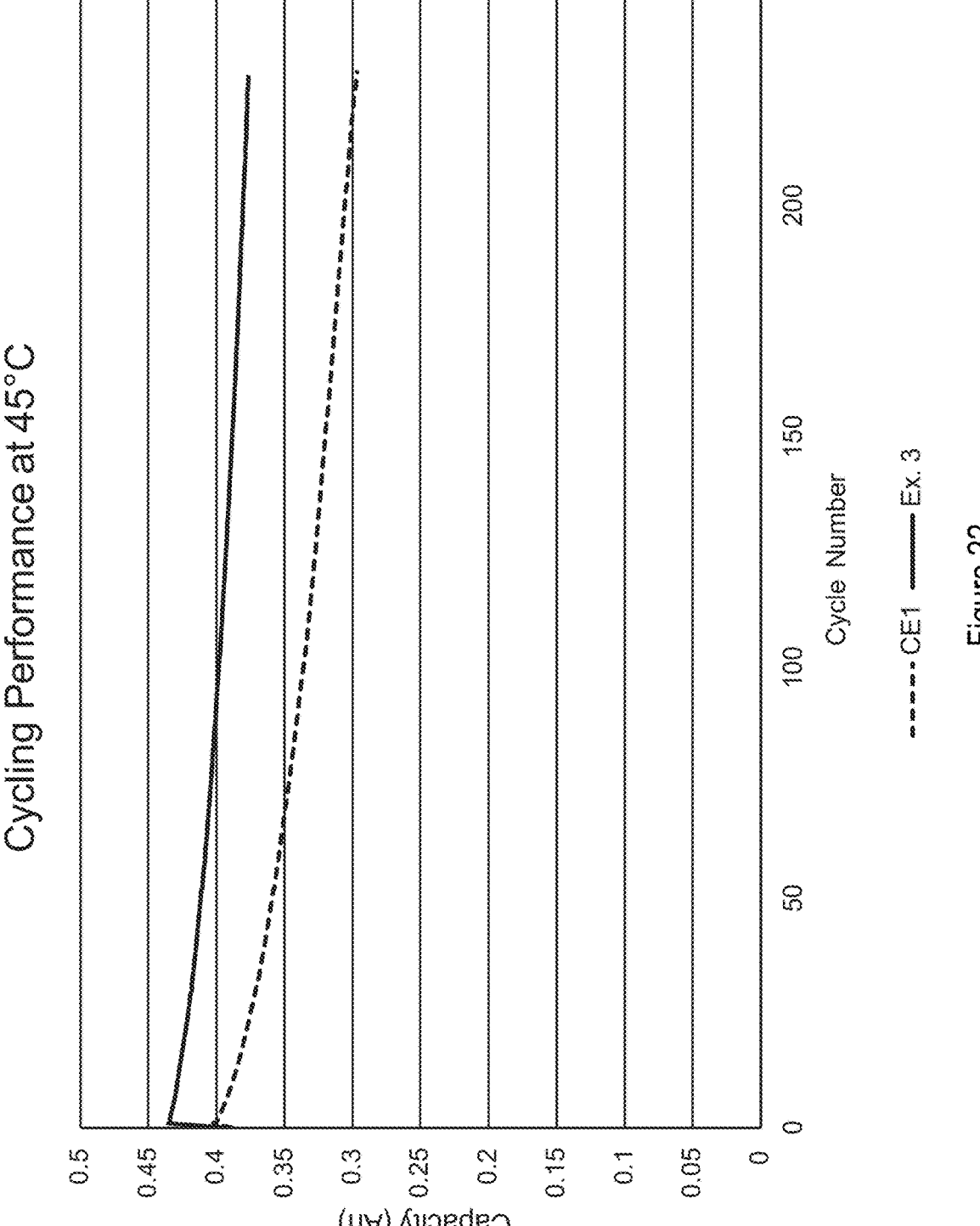
FIG. 22. includes Cycle Performance Test Results on 9 μm Polyethylene Microporous Separator Membranes.

The results of Battery Cycle testing are shown in FIG. 22 and indicate that Ex. 3 has higher a Capacity than CE1 which can be due to increased electrolyte absorption as a result of e-beam treatment. During e-beam treatment, polyethylene undergoes a series of chemical reactions including oxidation, which can generate carbonyl groups detectable by FTIR Analysis at 1720 cm$^{-1}$. The carbonyl groups can make the polyethylene more hydrophilic which can lead to the PE membrane absorbing more electrolyte, resulting in a higher Capacity. Ex. 3 was cycled for approximately 200 cycles and shows consistent higher Capacity than the non-radiation treated CE 1.

Test Methods

Thickness

Thickness is measured using the Emveco Microgage 210-A precision micrometer thickness tester according to test procedure ASTM D374. Thickness values are reported in units of micrometers, μm.

Puncture Strength

Test samples are first pre-conditioned to 73.4 deg C. and a relative humidity of 50% for a minimum of 20 minutes. An Instron Model 4442 is used to measure puncture strength of test sample based on ASTM D3763. Thirty measurements are made across the diagonal direction of a 1¼×40" continuous sample specimen and averaged. The needle has a 0.5 mm radius. The rate of descent is 25 mm/min. The film is held tight in a clamping device which utilizes an O-ring to securely hold the test sample in place. The diameter of this secured area is 25 mm. The displacement (in mm) of the film that was pierced by the needle is recorded against the resistance force (in gram force) developed by the tested film. The maximum resistance force is the puncture strength in units of gram force (gf). A load-versus-displacement plot is produced by this test method.

Pore Size Distribution

Pore size is measured using the Aquapore Porosimeter available through Porous Materials, Inc. (PMI). Pore size is expressed in μm.

Porosity

The porosity of a microporous film sample is measured using ASTM method D-2873 and is defined as the percentage void spaces in a microporous membrane.

TD and MD Tensile Strength

The Tensile strength is measured along the Machine direction (MD) and the Transverse direction (TD) using Instron Model 4201 according to ASTM D-882 method.

Electrical Resistance (ER) (Also Known as Ionic Resistance, IR)

Electrical Resistance is defined as the Resistance value in ohm-cm$^2$ of a separator filled with electrolyte. The units of electrical resistance are ohm-cm$^2$. The separator resistance is characterized by cutting small pieces of separators from the finished material and then placing them between two blocking electrodes. The separators are saturated with the battery electrolyte with 1.0 M LiPF$_6$ salt in EC/EMC solvent of 3:7 ratio by volume. The Resistance, R, in Ohms (Ω), of the separator is measured by a 4-probe AC impedance technique. In order to reduce the measurement error on the electrode/separator interface, multiple measurements are needed by adding more layers. Based on the multiple layer measurements, the electric (ionic) resistance, R$_s$ (Ω), of the separator saturated with electrolyte is then calculated by the formula R$_s$=p$_s$l/A where p$_s$ is the ionic resistivity of the separator in Ω-cm, A is the electrode area in cm$^2$ and l is the thickness of the separator in cm. The ratio p$_s$/A is the slope calculated for the variation of the separator resistance (ΔR) with multiple layers (Δδ) which =ΔR/Δδ.

Thermal Shrinkage

Shrinkage testing is measured by placing a 10 cm×10 cm membrane sample in a manila folder which is then suspended in an oven using a clip. Shrinkage was measured using calipers in the MD and TD direction before and after a test sample were was placed in the oven at 105° C. for 1 hour. Shrinkage was also measured using calipers in the MD and TD direction before and after a second test sample were was placed in the oven at 120° C. for 1 hour. Shrinkage is expressed as a % MD shrinkage and % TD shrinkage using modified ASTM 2732-96.

Dielectric Breakdown (DB)

Dielectric breakdown (DB) is the measurement of the electrical insulation property of a separator. Voltage is applied to a separator membrane at a ramp rate of 6,000V/sec until the dielectric breakdown of the sample is observed. High DB is indicative that the separator will have good winding yields and low HiPot failure rate.

Hot Electrical Resistance (ER)

Hot Electrical Resistance is a measure of resistance of a separator film under 50 lb pressure while the temperature is linearly increased at a rate of 60° C./minute. A ⅜" diameter piece of separator is saturated with electrolyte and sandwiched between two electrode discs made of Al or Cu. The rise in resistance, measured as Impedance, corresponds to a collapse in pore structure due to melting or "shutdown" of the separator Membrane. When a separator membrane has sustained high level of electrical resistance at elevated temperatures, this is indicative that the separator membrane may prevent electrode shorting in a battery.

Gurley

Gurley is defined as the Japanese Industrial Standard (JIS Gurley) JIS P8117 and is an air permeability test measured using the OHKEN permeability tester. JIS Gurley is the time in seconds required for 100 cc of air to pass through one square inch of film at constant pressure of 4.8 inches of water.

Mixed Penetration

Mixed Penetration is the force required to create a short through a separator when placed between cathode and anode materials. This test is used to indicate the tendency of a separator to allow short circuits during the battery assembly. Details of this method are described in US 2010/209758.

Micro-Indentation

Micro-Indentation (also known as Micro-Penetration) is the maximum force at which a fine micron conical indenter tip penetrates a non-conductive film sample and makes contact with the conductive substrate on a testing stage as defined by a sudden drop in electrical resistance. Test method is described in U.S. Patent application 2014/0090480. It is express in units of mNf.

Contact Angle Measurement

Contact angle was measured using Kruss Drop Shape Analyzer. The electrolyte used for the contact angle test was anhydrous Propylene Carbonate (PC). A 3 µL droplet of PC was dispensed carefully and gently onto the surface of a separator test sample. The contact angle was measured within 3 seconds of the application of the droplet of PC. The contact angle is reported in units of degrees.

In accordance with at least selected embodiments, aspects, or objects, the present application or invention is directed to novel or improved separator membranes, separators, batteries including such separators, methods of making such membranes and/or separators, and/or methods of using such membranes and/or separators. In accordance with at least certain embodiments, the present invention is directed to an ionized radiation treated microporous polyolefin, polyethylene (PE), copolymer, and/or polymer blend (e.g., a copolymer or blend comprising PE and another polymer, such as polypropylene (PP)) battery separator for a secondary or rechargeable lithium battery and/or a method of making an ionized radiation treated microporous battery separator.

The inventive microporous membrane or battery separator may provide a lower onset temperature of thermal shutdown, may have an extended thermal shutdown window where physical, dimensional, and mechanical integrity is maintained at higher temperatures, may improve battery safety performance in a rechargeable lithium battery, may provide a treated polyethylene separator membrane with the high temperature performance of a polypropylene-based trilayer product (by way of example only, a trilayer membrane made of two polypropylene layers with a polyethylene layer in between), may have reduced thermal shrinkage resulting in both improved thermal stability and high temperature physical integrity which may be important for maintaining the separation of cathode and anode in a battery system and avoiding a thermal runaway event in a rechargeable or secondary lithium battery, and/or combinations thereof.

The ionized radiation treatment of a microporous polyethylene battery separator provides a method to lower the onset temperature of thermal shutdown. Furthermore, the ionized radiation treated microporous polyethylene battery separator membrane has an extended thermal shutdown window where physical, dimensional, and mechanical integrity of the microporous separator membrane is maintained at higher temperatures. The extended high temperature dimensional integrity of the inventive ionized radiation treated separator membrane improves battery safety performance in a rechargeable lithium ion battery. In addition, the extended high temperature dimensional integrity of the inventive ionized radiation treated separator membrane approaches the high temperature performance of a polypropylene-based trilayer product (by way of example only, a trilayer membrane made of two polypropylene layers with a polyethylene layer in between). In addition, the inventive battery separator membrane has reduced thermal shrinkage resulting in both improved thermal stability and high temperature physical integrity which may be important for maintaining the separation of cathode and anode in a battery system and avoiding a thermal runaway event in a rechargeable or secondary lithium battery.

In accordance with at least selected embodiments, aspects, or objects, the present application or invention may provide and/or is directed to novel or improved or modified separator membranes, separators, batteries including such separators, methods of making such membranes and/or separators, and/or methods of using such membranes and/or separators. In accordance with at least certain embodiments, the present invention is directed to an ionized radiation treated microporous polyolefin, polyethylene (PE), polypropylene (PP), copolymer, and/or polymer blend (e.g., a copolymer or blend comprising PE and another polymer, such as polypropylene (PP)) membranes, microporous membranes, separator membranes, battery separators, and/or microporous battery separators for a secondary or rechargeable lithium battery and/or methods of making and/or using ionized radiation treated membranes, microporous membranes, separator membranes, battery separators, and/or microporous battery separators. The inventive microporous membrane or battery separator may provide a lower onset temperature of thermal shutdown, may have an extended thermal shutdown window where physical, dimensional, and mechanical integrity is maintained at higher temperatures, may have better oxidation resistance, may improve battery safety performance in a rechargeable lithium battery, may provide a treated polyethylene, polypropylene, or polyolefin separator membrane, may provide a treated dry process product with performance near, at or above a wet process product, may provide a treated polyethylene, polypropylene, or polyolefin separator membrane with higher temperature performance, may provide a treated polyethylene separator membrane with the high temperature performance of a polypropylene-based product, may provide a treated polyethylene separator membrane with the high temperature performance of a polypropylene-based multi-layer or tri-layer product (by way of example only, a trilayer membrane made of two polypropylene layers with a polyethylene or polypropylene layer in between or a trilayer membrane made of two polyethylene layers with a polypropylene or polyethylene layer in between), may have reduced thermal shrinkage resulting in both improved thermal stability and high temperature physical integrity which may be important for maintaining the separation of cathode and anode in a battery system, improving high temperature, high energy, high charge rate, and/or high voltage function, improving safety, and/or avoiding a short or thermal runaway event in a rechargeable or secondary lithium battery, and/or combinations thereof.

In accordance with at least selected embodiments, aspects, or objects, the present application or invention may provide and/or is directed to novel or improved separator membranes, separators, batteries including such separators, methods of making such membranes and/or separators, and/or methods of using such membranes and/or separators, and/or ionized radiation treated microporous polyolefin, polyethylene (PE), copolymer, and/or polymer blend (e.g., a copolymer or blend comprising PE and another polymer, such as polypropylene (PP) battery separators for secondary or rechargeable lithium batteries and/or a methods of making ionized radiation treated microporous battery separators as shown or described herein; a microporous membrane or battery separator having a lower onset temperature of thermal shutdown, an extended thermal shutdown window, physical, dimensional, and/or mechanical integrity maintained at higher temperatures, improved battery safety performance in a rechargeable lithium battery, a treated polyethylene separator membrane with the high temperature performance of a polypropylene membrane or separator membrane, or polypropylene-based trilayer product (by way of example only, a trilayer membrane made of two polypropylene layers with a polyethylene layer in between), reduced thermal shrinkage resulting in both improved thermal stability and high temperature physical integrity, which maintains the separation of cathode and anode in a battery system and avoids thermal runaway in a rechargeable or secondary lithium battery, and/or combinations thereof; novel, optimized or improved separator membranes, separators, batteries including such separators, methods of making such membranes and/or separators, and/or methods of using such membranes and/or separators as shown or described herein; and/or the like.

The present invention may be embodied in other forms without departing from the spirit and the essential attributes thereof, for example, cross-linking may be accomplished via e-beam, heat, light, additives, agents, and/or the like, and, accordingly, reference should be made to the appended claims, rather than to the foregoing specification, as indicating the scope of the invention. Additionally, the invention disclosed herein suitably may be practiced in the absence of any element which is not specifically disclosed herein

What is claimed is:

1. A microporous battery separator membrane, comprising:
   a microporous polyolefin separator membrane having a thickness less than about 14 μm and wherein:
   said microporous polyolefin separator membrane has an onset of thermal shutdown occurring at a temperature ≤138° C.;
   said microporous polyolefin separator membrane has % machine direction thermal shrinkage at 120° C. for one hour of ≤7.5%;
   said microporous polyolefin separator membrane has % transverse direction thermal shrinkage at 120° C. for one hour ≤1%; and/or
   said microporous polyolefin separator membrane has been improved and/or modified using ionized radiation energy at an energy from 100 to 120 kGy.

2. The battery separator membrane of claim 1 wherein said microporous polyolefin separator membrane has been improved and modified using low energy electron beam radiation.

3. The battery separator membrane of claim 2 wherein said low energy electron beam radiation is applied using a single dosage application step.

4. The battery separator membrane of claim 2 wherein said microporous polyolefin separator membrane is a single layer membrane, a multiple layer membrane, a single ply structure, or a multi-ply structure.

5. The battery separator membrane of claim 2 wherein said microporous polyolefin separator membrane comprises polyethylene.

6. The battery separator membrane of claim 1 wherein the polyolefin is a semi-crystalline polymer.

7. The battery separator membrane of claim 1 wherein the polyolefin is polyethylene or polypropylene.

8. The battery separator membrane of claim 7 wherein the polyolefin is polyethylene having a molecular weight less than 800,000.

9. The battery separator membrane of claim 7 wherein the polyolefin is polyethylene and the polyethylene microporous separator membrane is manufactured using a wet process.

10. The battery separator membrane of claim 1 wherein said microporous polyolefin separator membrane has a thermal shutdown window extended from ≤138° C. to ≥155° C., extended from ≤138° C. to ≥160° C., or extended from ≤138° C. to ≥170° C. at an Electrical Resistance ≥1000 ohm-cm².

11. A rechargeable lithium-ion battery comprising the microporous battery separator membrane of claim 1.

12. A method of producing a more wettable polyethylene battery separator, wherein said method comprises providing the battery separator membrane of claim 1, wherein the polyolefin comprises polyethylene; and treating said battery separator with low energy electron beam radiation.

13. The method of claim 12, wherein said treatment with said low energy electron beam radiation includes a dose ranging from about 50 to about 150 kGy.

14. A microporous polyolefin battery separator membrane, comprising:
   a microporous separator membrane having a thickness less than about 14 μm and wherein:
   said microporous separator membrane has at least one of:
   an onset of thermal shutdown occurring at a temperature ≤138° C.;

% machine direction thermal shrinkage at 120° C. for one hour of ≤7.5%; and,

% transverse direction thermal shrinkage at 120° C. for one hour ≤1%;

and wherein said microporous separator membrane has been improved and/or modified by cross-linking using ionized radiation at a power between 100 and 120 kGy.

15. In a separator, battery, device, product, or vehicle, the improvement comprising the membrane of claim 14.

16. In a separator, battery, device, product, or vehicle, the improvement comprising the membrane of claim 1.

17. A microporous battery separator membrane comprising:

a microporous polyolefin separator membrane modified with low energy electron beam radiation from 100 to 120 kGy, and having a thickness of 20 microns or less and wherein:

said microporous polyolefin separator membrane has an onset of thermal shutdown occurring at a temperature ≤138° C.;

said microporous polyolefin separator membrane has % machine direction thermal shrinkage at 120° C. for one hour of ≤7.5%; and/or said microporous polyolefin separator membrane has % transverse direction thermal shrinkage at 120° C. for one hour ≤1%.

18. The battery separator membrane of claim 17 wherein said low energy electron beam radiation is applied using a single dosage application step.

19. The battery separator membrane of claim 17 wherein said microporous polyolefin separator membrane is a single layer membrane, a multiple layer membrane, a single ply structure, or a multi-ply structure.

20. The battery separator membrane of claim 17 wherein said microporous polyolefin separator membrane comprises polyethylene.

21. The battery separator membrane of claim 17 wherein the polyolefin is a semi-crystalline polymer.

22. The battery separator membrane of claim 17 wherein the polyolefin is polyethylene or polypropylene.

23. The battery separator membrane of claim 22 wherein the polyolefin is polyethylene having a molecular weight less than 800,000.

24. The battery separator membrane of claim 22 wherein the polyolefin is polyethylene and the polyethylene microporous separator membrane is a wet process membrane.

25. The battery separator membrane of claim 17 wherein said microporous polyolefin separator membrane has a thermal shutdown window extended from ≤138° C. to ≥155° C., extended from ≤138° C. to ≥160° C., or extended from ≤138° C. to ≥170° C. at an Electrical Resistance ≥1000 ohm-cm$^2$.

26. A rechargeable lithium-ion battery comprising the microporous battery separator membrane of claim 17.

27. A microporous polyolefin battery separator membrane comprising:

a microporous separator membrane having a thickness of 20 microns or less, the polyolefin is cross-linked with low energy electron beam radiation in a dosage ≥100 kGy and ≤120 kGy, and wherein:

said microporous separator membrane has at least one of:

an onset of thermal shutdown occurring at a temperature ≤138° C.;

% machine direction thermal shrinkage at 120° C. for one hour of ≤7.5%; and/or

% transverse direction thermal shrinkage at 120° C. for one hour ≤1%.

28. A separator, battery, device, product, or vehicle comprising the membrane of claim 27.

29. A separator, battery, device, product, or vehicle comprising the membrane of claim 17.

30. The microporous battery separator membrane of claim 25, wherein said microporous polyolefin separator membrane has a thermal shutdown window extended from ≤138° C. to ≥160° C. at an Electrical Resistance ≥1000 ohm-cm$^2$.

31. The microporous battery separator membrane of claim 25, wherein said microporous polyolefin separator membrane has a thermal shutdown window extended from ≤138° C. to ≥170° C. at an Electrical Resistance ≥1000 ohm-cm$^2$.

* * * * *